United States Patent
Lim et al.

(10) Patent No.: US 12,265,422 B2
(45) Date of Patent: Apr. 1, 2025

(54) CONTACT STRUCTURE FOR COUPLING WITH EXTERNAL ELECTRONIC DEVICE AND ELECTRONIC DEVICE INCLUDING SAME

(71) Applicant: Samsung Electronics Co., Ltd., Suwon-si (KR)

(72) Inventors: Jinho Lim, Suwon-si (KR); Heecheul Moon, Suwon-si (KR); Jihoon Kim, Suwon-si (KR); Byounguk Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 204 days.

(21) Appl. No.: 18/168,279

(22) Filed: Feb. 13, 2023

(65) Prior Publication Data
US 2023/0195168 A1    Jun. 22, 2023

Related U.S. Application Data

(63) Continuation of application No. PCT/KR2022/014542, filed on Sep. 28, 2022.

(30) Foreign Application Priority Data

Oct. 25, 2021   (KR) .................. 10-2021-0142828
Nov. 26, 2021   (KR) .................. 10-2021-0165838

(51) Int. Cl.
*G06F 1/16*   (2006.01)

(52) U.S. Cl.
CPC .......... *G06F 1/1632* (2013.01); *G06F 1/1679* (2013.01); *G06F 1/1654* (2013.01)

(58) Field of Classification Search
CPC .... G06F 1/1626; G06F 1/1632; G06F 1/1654; G06F 1/1656; G06F 1/1669; G06F 1/1681

(Continued)

(56) References Cited

U.S. PATENT DOCUMENTS 8,029,291 B2   10/2011   Park
8,498,100 B1 *  7/2013   Whitt, III .............. H05K 5/0234
                                                       361/679.28

(Continued)

FOREIGN PATENT DOCUMENTS

JP   2017-112172 A   6/2017
JP   2018-526750 A   9/2018

(Continued)

OTHER PUBLICATIONS

International Search Report dated Dec. 14, 2022, issued in International Application No. PCT/KR2022/014542.

(Continued)

*Primary Examiner* — Adrian S Wilson
(74) *Attorney, Agent, or Firm* — Jefferson IP Law, LLP

(57) ABSTRACT

A cover device of an electronic device is provided. The cover device includes a cover housing configured to cover at least a portion of the electronic device in a first state in which the electronic device is electrically coupled to the cover device, and a bracket including a first surface on which a terminal part is disposed and a second surface which faces the cover housing, wherein the bracket includes at least one first magnet disposed adjacent to the first surface and at least one second magnet disposed adjacent to the second surface, the cover housing includes at least one third magnet, and the at least one third magnet is disposed to align with the at least one second magnet in a second state in which the electronic device is electrically isolated from the cover device.

22 Claims, 20 Drawing Sheets

(58) Field of Classification Search
USPC .................. 361/679.09, 679.17, 679.29
See application file for complete search history.

(56) References Cited

U.S. PATENT DOCUMENTS

| | | | |
|---|---|---|---|
| 9,025,321 B2 | 5/2015 | Liang | |
| 9,497,300 B2 | 11/2016 | Longo et al. | |
| 9,727,092 B1 | 8/2017 | Gerbus et al. | |
| 9,851,745 B2 | 12/2017 | Lev et al. | |
| 9,946,295 B2 | 4/2018 | Smith et al. | |
| 9,946,305 B2 | 4/2018 | Fujikawa | |
| 10,082,840 B2* | 9/2018 | Esmaeili | H01R 13/6205 |
| 10,203,728 B2 | 2/2019 | Koo et al. | |
| 10,579,097 B2 | 3/2020 | Wagman et al. | |
| 10,615,538 B2 | 4/2020 | Cho | |
| 10,671,121 B2 | 6/2020 | Zhu et al. | |
| 11,095,071 B2 | 8/2021 | Lee et al. | |
| 2012/0066865 A1* | 3/2012 | Lauder | G06F 1/1626 16/382 |
| 2012/0194448 A1* | 8/2012 | Rothkopf | G06F 1/1643 361/679.01 |
| 2014/0321070 A1 | 10/2014 | Wang et al. | |
| 2014/0355192 A1 | 12/2014 | Lin | |
| 2015/0281413 A1* | 10/2015 | Longo | H04M 1/0212 361/679.29 |
| 2017/0068276 A1* | 3/2017 | Wagman | H01R 13/2442 |
| 2017/0153664 A1 | 6/2017 | Tsai et al. | |

FOREIGN PATENT DOCUMENTS

| | | |
|---|---|---|
| KR | 10-2010-0019319 A | 2/2010 |
| KR | 10-2016-0138493 A | 12/2016 |
| KR | 10-2017-0073924 A | 6/2017 |
| KR | 10-2018-0095482 A | 8/2018 |
| KR | 10-2018-0119342 A | 11/2018 |
| KR | 10-2021-0031520 A | 3/2021 |

OTHER PUBLICATIONS

Extended European Search Report dated Oct. 18, 2024, issued in European Application No. 22887383.2-1218.

* cited by examiner

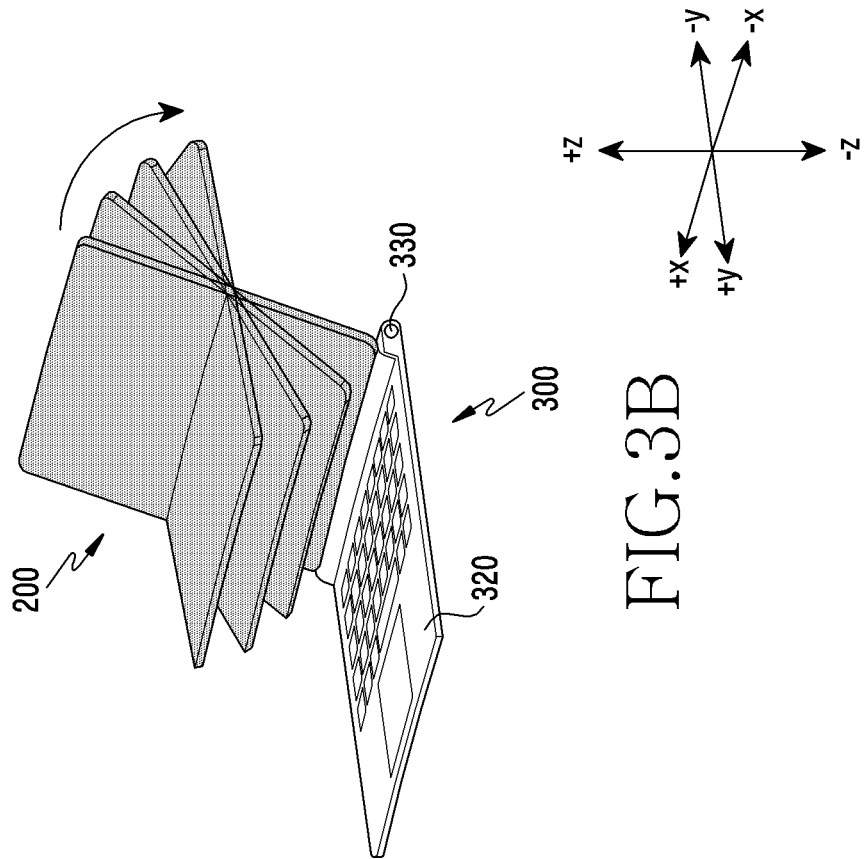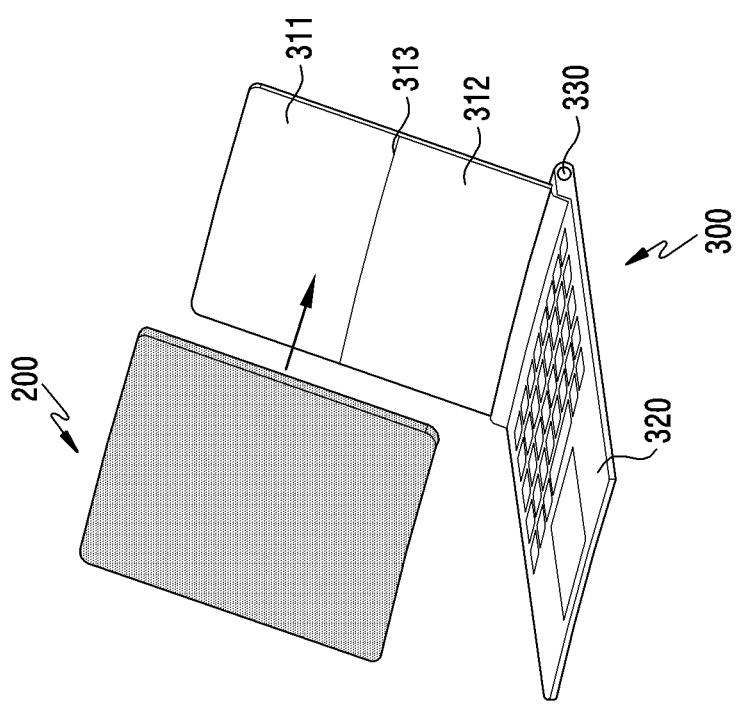

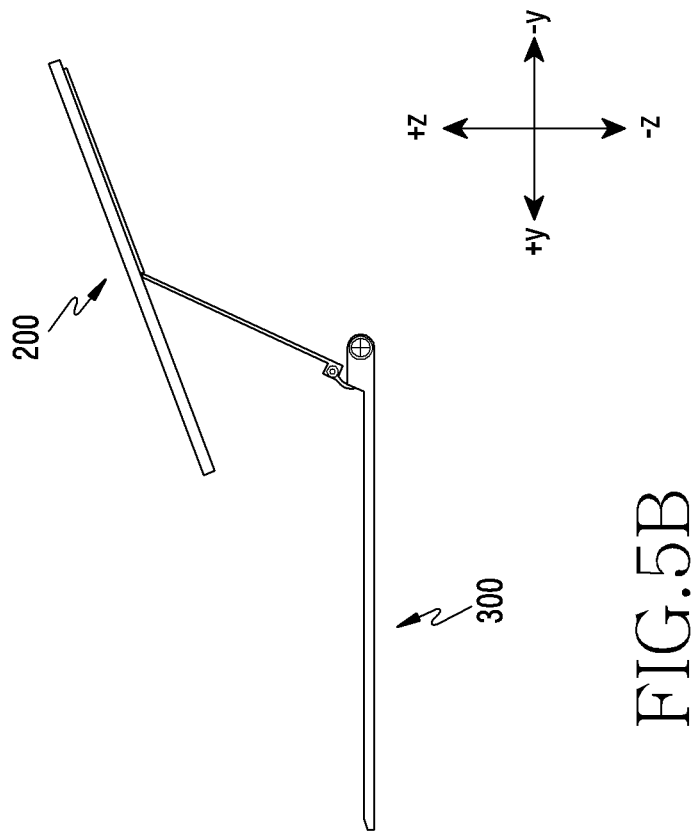
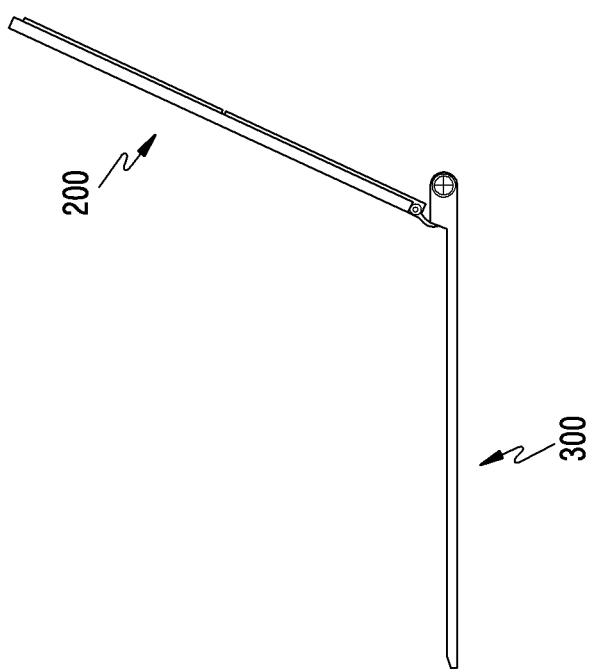
FIG.5B
FIG.5A

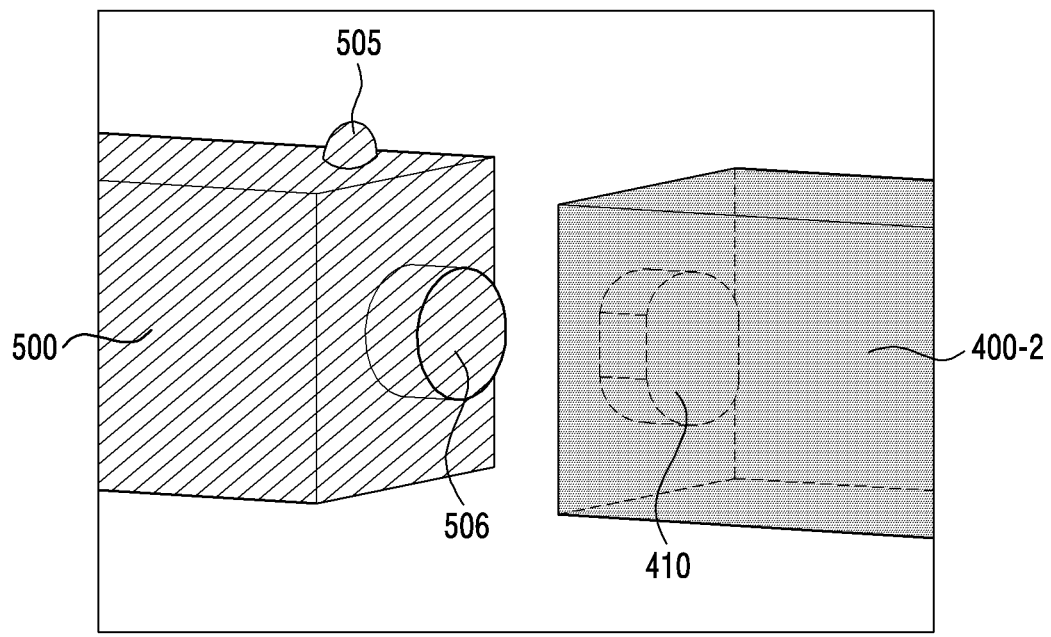
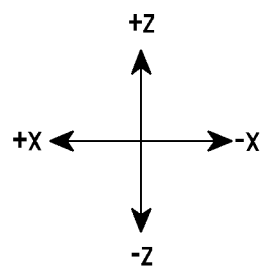
FIG.11

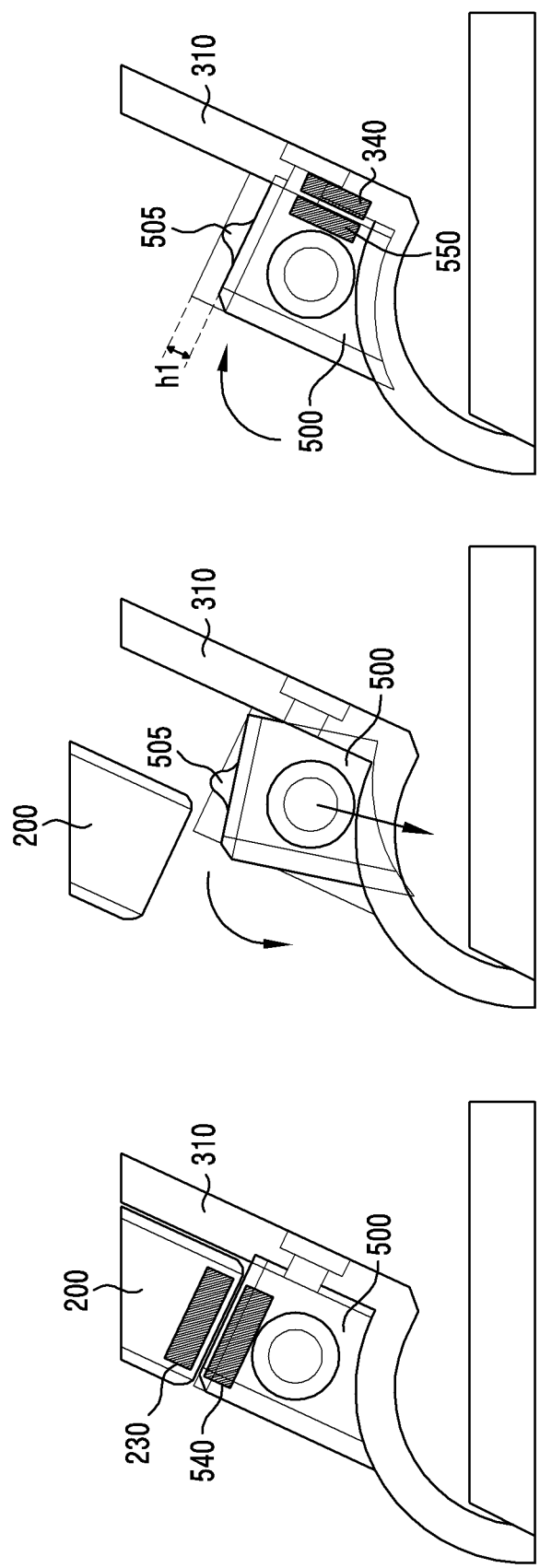

CONTACT STRUCTURE FOR COUPLING WITH EXTERNAL ELECTRONIC DEVICE AND ELECTRONIC DEVICE INCLUDING SAME

CROSS-REFERENCE TO RELATED APPLICATION(S)

This application is a continuation application, claiming priority under § 365(c), of an International application No. PCT/KR2022/014542, filed on Sep. 28, 2022, which is based on and claims the benefit of a Korean patent application number 10-2021-0142828, filed on Oct. 25, 2021, in the Korean Intellectual Property Office, and of a Korean patent application number 10-2021-0165838, filed on Nov. 26, 2021, in the Korean Intellectual Property Office, the disclosure of each of which is incorporated by reference herein in its entirety.

TECHNICAL FIELD

The disclosure relates to a coupling structure between an electronic device and an external electronic device in the case where the assembly direction between the electronic device and a cover device and the coupling direction of a terminal part (the terminal of the electronic device and the terminal of the cover device) are perpendicular to each other.

BACKGROUND ART

Electronic devices may be provided with touch screens that simultaneously perform input and output in consideration of ease of use, and the touch screens may have various sizes. With the rapid improvement of electronic devices, peripheral devices that are connectable to the electronic devices are also being improved.

The electronic devices may be electrically connected to peripheral devices (e.g., a cover device and an external input device) supporting various functions thereof, and may be improved in convenience of use by using the peripheral devices electrically connected thereto.

The above information is presented as background information only to assist with an understanding of the disclosure. No determination has been made, and no assertion is made, as to whether any of the above might be applicable as prior art with regard to the disclosure.

DISCLOSURE

Technical Problem

When an electronic device and a peripheral device are connected to each other, a compressible contact structure such as a pogo pin may be used for transmission/reception of power and/or signal. Conventionally (e.g., see FIG. 2), an electronic device and a peripheral device have been coupled in the same direction as the coupling direction (or compression direction) of a compressible contact structure.

When the coupling direction (or compression direction) of a compressible contact structure and an inter-device coupling direction are not the same, for example, perpendicular to each other, an impact may be applied to the contact structure when an electronic device is assembled to a peripheral device, and a defect may be caused in the contact structure.

Aspects of the disclosure are to address at least the above-mentioned problems and/or disadvantages and to provide at least the advantages described below. Accordingly, an aspect of the disclosure is to provide a method capable of reducing an impact to the contact structure by using a magnetic force of magnets disposed at various positions of the device in the case where the coupling direction (or compression direction) of a compressible contact structure and an inter-device coupling direction are perpendicular to each other.

Additional aspects will be set forth in part in the description which follows and, in part, will be apparent from the description, or may be learned by practice of the presented embodiments.

Technical Solution

In accordance with an aspect of the disclosure, a cover device of an electronic device is provided. The cover device includes a cover housing configured to cover at least a portion of the electronic device in a first state in which the electronic device is electrically coupled to the cover device, and a bracket including a first surface on which a terminal part is disposed and a second surface which faces the cover housing, wherein the bracket may include at least one first magnet disposed adjacent to the first surface and at least one second magnet disposed adjacent to the second surface, the cover housing may include at least one third magnet, and the at least one third magnet may be disposed to align with the at least one second magnet in a second state in which the electronic device is electrically isolated from the cover device.

In accordance with another aspect of the disclosure, an external input device that is couplable to an electronic device is provided. The external input device includes a housing, and a bracket including a terminal part electrically connected to a contact part of the electronic device, wherein the bracket may include at least one first magnet disposed adjacent to a first surface on which the terminal part is disposed, and at least one second magnet disposed perpendicular to the at least one first magnet, the housing may include at least one third magnet, a coupling direction between the contact part of the electronic device and the terminal part of the bracket may be perpendicular to a coupling direction between the electronic device and the external input device, and a circular protrusion disposed on the bracket may guide the rotation and position shift of the bracket depending on a change in coupling state between the electronic device and the external input device.

Advantageous Effects

According to various embodiments disclosed herein, by moving the position of the terminal part disposed on the cover device depending on the coupling state between the electronic device and the cover device electrically connectable to the electronic device, it is possible to reduce an impact to the terminal part which may occur when the electronic device and the cover device are assembled.

According to various embodiments disclosed herein, by implementing the rotation and vertical movement of the terminal part of the cover device by using two magnetic force lines acting perpendicular to each other, it is possible to minimize the size of the overall structure and to improve the assembly operation sensation between the electronic device and the cover device.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which:

FIGS. 3A and 3B illustrate an electronic device and an external electronic device that is couplable to the electronic device according to various embodiments of the disclosure;

FIGS. 5A and 5B are views illustrating various coupled states between the electronic device and the cover device according to various embodiments of the disclosure;

FIG. 11 is a view illustrating a coupling structure between the bracket and the support member of the cover device according to an embodiment of the disclosure;

FIGS. 16A, 16B, and 16C are projection views illustrating a series of processes in which the electronic device and the cover device are switched from an electrically coupled state to an electrically separated state according to various embodiments of the disclosure;

Throughout the drawings, like reference numerals will be understood to refer to like parts, components, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
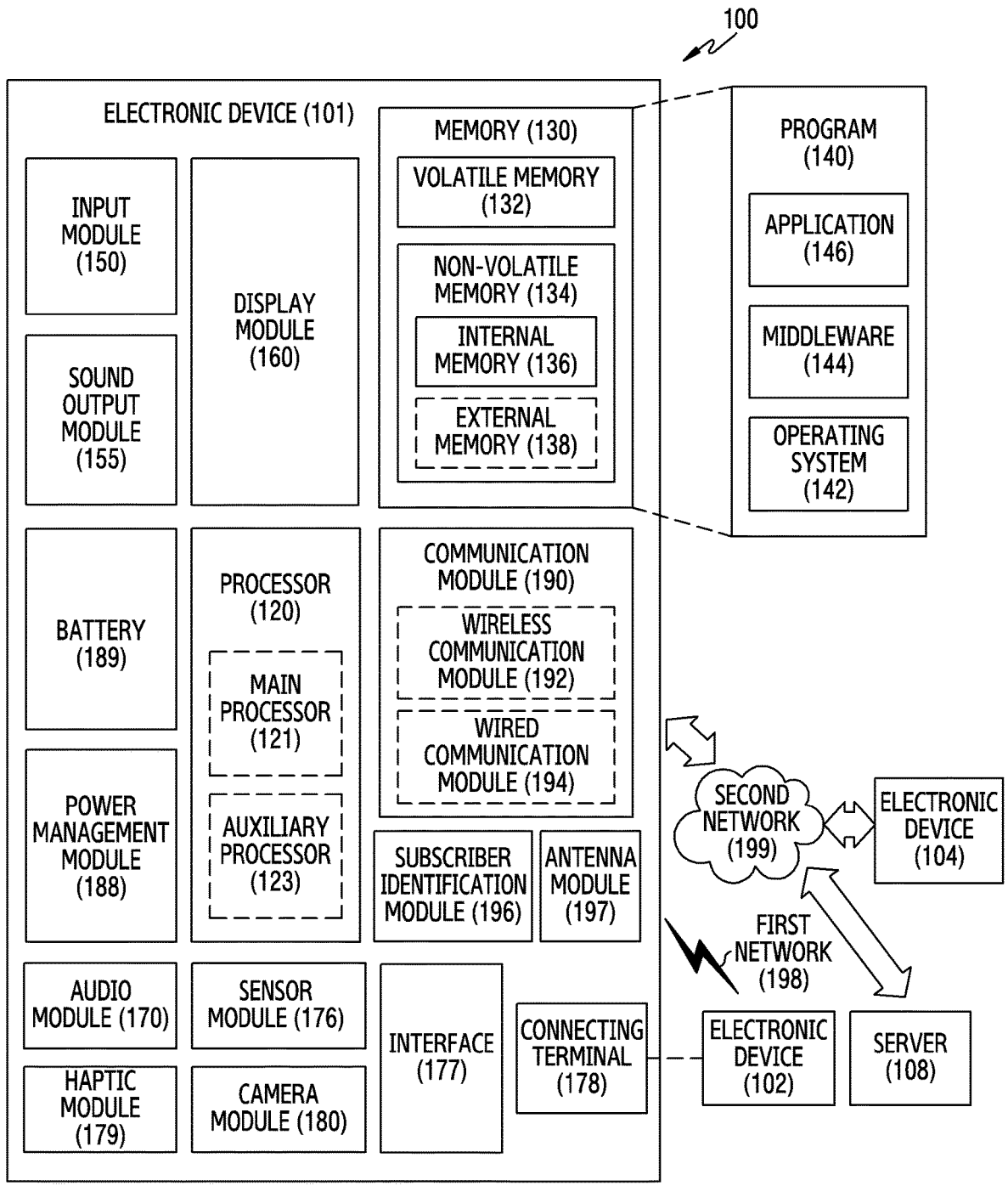
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 of 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
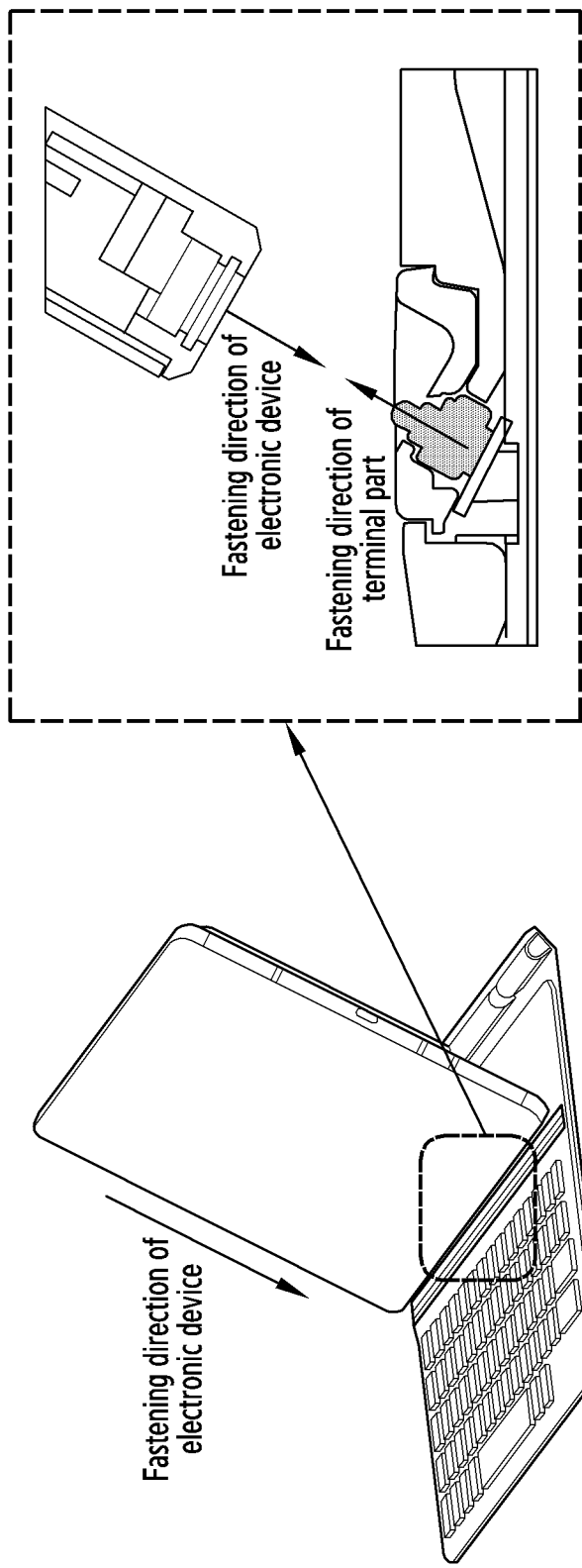
FIG. 2 is a view illustrating a method in which an electronic device and an external electronic device according to a comparative embodiment are coupled to each other according to an embodiment of the disclosure.

FIG. 2 is a view illustrating a method in which an electronic device and an external electronic device according to a comparative embodiment are coupled to each other according to an embodiment of the disclosure.

Referring to FIG. 2, the electronic device according to the comparative embodiment may be electrically coupled to an external electronic device, and may transmit/receive power and/or data via a terminal part in the state in which the electronic device and the external electronic device are electrically connected to each other. For example, the terminal part may be a terminal having a compressible contact structure such as a pogo pin. In FIG. 2, the electronic device and the external electronic device may be coupled in the same direction as the coupling direction of the compressible contact structure (or the compression direction of the compressible contact structure).

When the coupling direction of the compressible contact structure and the inter-device coupling direction are not the same, a defect may occur in the compressive contact structure when the electronic device and the external electronic device are coupled to each other. Hereinafter, in various embodiments of the disclosure, a contact structure capable of being protected when the coupling direction of the compressible contact structure and the inter-device coupling direction are substantially perpendicular will be described.

FIGS. 3A and 3B illustrate an electronic device 200 (e.g., the electronic device 101 in FIG. 1) and an external electronic device 300 (e.g., the electronic device 101 in FIG. 1) that is couplable to the electronic device 200 according to various embodiments of the disclosure.

FIG. 3A illustrates a process in which the electronic device 200 and the external electronic device 300 are electrically coupled from a separated state, and FIG. 3B illustrates a method of operating the external electronic device 300 electrically coupled to the electronic device 200.

Figure 4:
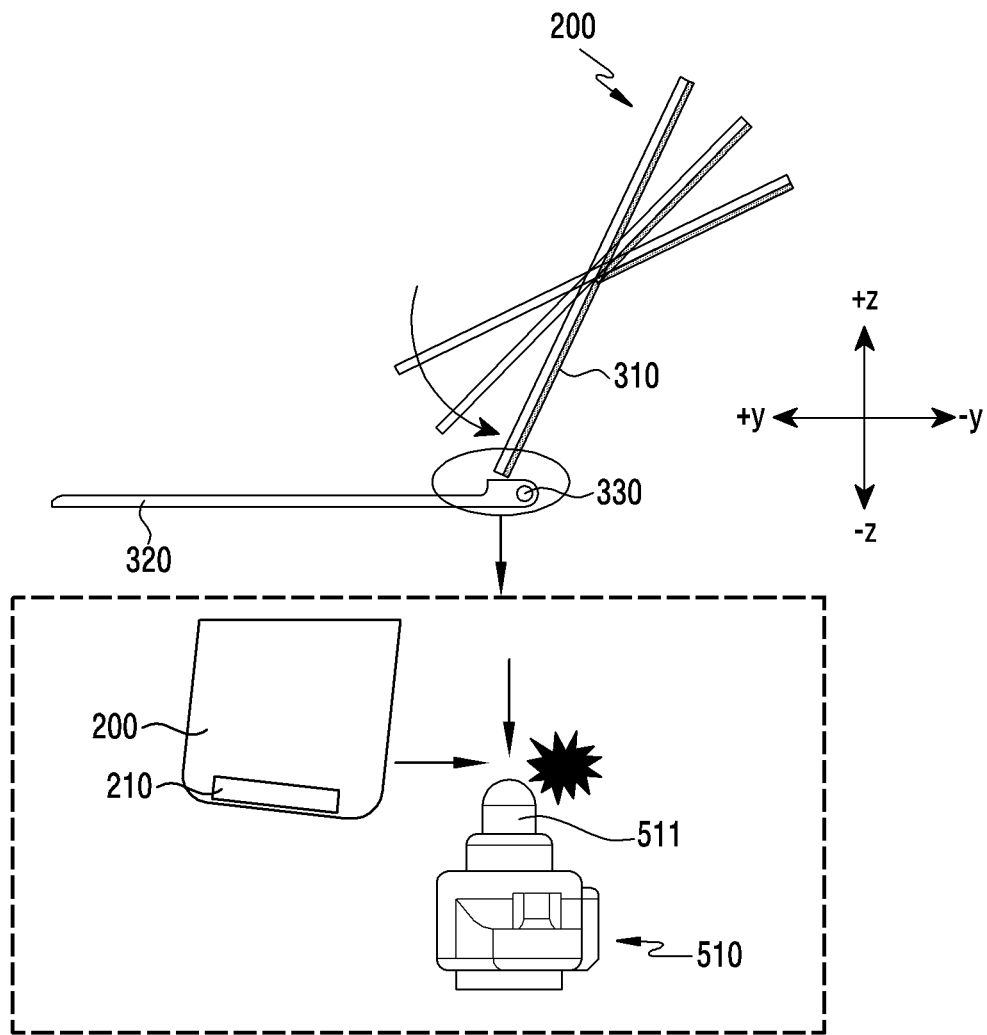
FIG. 4 is a view illustrating a method of operating a cover device coupled to the electronic device according to an embodiment of the disclosure.

Referring to FIG. 3A, the electronic device 200 may have a structure that is electrically couplable to the external electronic device 300 (e.g., the contact part 210 in FIG. 4), and the external electronic device 300 may also have a structure that is electrically couplable to the electronic device 200 (e.g., the terminal part 510 in FIG. 4). The electronic device 200 and the external electronic device 300 may be subjected to state change between an electrically coupled state and an electrically separated state.

In various embodiments of the disclosure, the external electronic device 300 may be various devices such as a cover device that is capable of covering at least a portion of the electronic device 200 in the state of being coupled to the electronic device 200, and/or an input device capable of providing an input to the electronic device 200 in the state of being coupled to the electronic device 200. The external electronic device 300 is not limited in type as long as it has a structure that is electrically connectable to the electronic device 200. Hereinafter, for convenience of description, the external electronic device 300 will be referred to as a cover device 300.

According to an embodiment, the cover device 300 may include a first housing (or a cover housing) 310, a second housing (or a main body housing) 320, and a hinge housing 330. The hinge housing 330 may serve to connect the first housing 310 and the second housing 320 to each other, and the first housing 310 may be connected to the second housing 320 via the hinge housing 330 and may rotate (e.g., pivot) within a predetermined angular range relative to the second housing 320. The first housing 310 may cover at least a portion of the electronic device 200 in the state in which the cover device 300 is coupled to the electronic device 200. For example, the electronic device 200 may be protected from an external impact by covering the rear surface of the electronic device 200. According to an embodiment, the first housing 310 may include a split portion 313, and may be divided into a first area 311 and a second area 312 based on the split portion 313. The first area 311 may rotate relative to the second area 312 about the split portion 313. The second housing may include at least one key for providing an input to the electronic device 200 in the state in which the cover device 300 is coupled to the electronic device 200. For example, the second housing 320 may provide a keyboard function to the electronic device 200 in the state in which the cover device 300 is coupled to the electronic device 200.

Referring to FIG. 3A, the electronic device 200 may be coupled to the cover device 300. According to an embodiment, the first housing 310 of the cover device 300 may include a magnet. The first housing 310 may be attached to the electronic device 200 due to a magnetic force between the magnet disposed on the first housing 310 and a magnet (or a magnetic member) disposed on the rear surface of the electronic device 200. According to an embodiment, when the electronic device 200 and the first housing 310 of the cover device 300 are coupled (or attached) to each other, the electronic device 200 and the cover device 300 may be electrically connected to each other via a compressive contact structure. The compressible contact structure of the disclosure will be described in detail with reference to FIG. 4.

Referring to FIG. 3B, in a state in which the electronic device 200 and the first housing 310 are coupled, the first area 311 may rotate (e.g., pivot) within a predetermined angular range relative to the second area 312 about the split portion 313. In this case, the first area 311 of the first housing 310 may continuously cover the electronic device 200, and the second area 312 of the first housing 310 may be separated from the electronic device 200. When the second area 312 is separated from the electronic device 200 due to the rotation (e.g., clockwise rotation) of the first area 311, the electrical connection between the electronic device 200 and the cover device 300 may also be separated.

For example, the first housing 310 may include one plate disposed in the first area 311 and another plate disposed in the second area 312, and the two plates may be covered with a single outer cover. In this case, the first area 311 may rotate within a predetermined angular range relative to the second area 312 about the split portion 313 by using the outer cover that connects the first area 311 and the second area 312.

For example, a hinge structure may be included in the split portion 313. In this case, the first area 311 may rotate within a predetermined angular range relative to the second area 312 about the split portion 313 by using the hinge structure of the split portion 313.

According to an embodiment, when the first area 311 and the second area 312 of the first housing 310 are arranged side by side, the electronic device 200 coupled to the first housing 310 may be electrically coupled to the cover device 300, and when the first area 311 and the second area 312 of the first housing 310 are not arranged side by side, the electronic device 200 may be electrically separated from the cover device 300. For example, as a result of the arrangement of the first area 311 and the second area 312, the electronic device 200 and the cover device 300 may be electrically coupled to or separated from each other.

FIG. 4 is a view illustrating a method of operating the cover device 300 coupled to the electronic device 200 according to an embodiment of the disclosure.

FIGS. 5A and 5B are views illustrating various coupled states between the electronic device 200 and the cover device 300 according to various embodiments of the disclosure.

Referring to FIG. 4, in a state in which only the first area 311 of the first housing 310 covers the rear surface of the electronic device 200, for example, in a state in which the first area 311 and the second area 312 of the first housing 310 are not arranged side by side, the first area 311 may rotate about the split portion 313. Depending on the rotation of the first area 311 (e.g., counterclockwise rotation), the first area 311 and the second area 312 of the first housing 310 may be arranged side by side, and the electronic device 200 and the cover device 300 may be electrically coupled to each other. According to an embodiment, the contact part 210 of the electronic device 200 may come into contact with the terminal part 510 of the cover device 300, and due to the coupling between the contact part 210 and the terminal part 510, the electronic device 200 and the cover device 300 may be electrically coupled to each other. For example, as pins 511 of the terminal part 510 come into contact with the contact part 210, the terminal part 510 and the contact part 210 may be electrically connected to each other.

According to an embodiment, the terminal part 510 of the cover device 300 may include pins 511 configured to come into contact with the contact part 210 of the electronic device 200, and the pins 511 of the terminal part 510 may have a structure to be compressed (e.g., a compressible contact structure) by the coupling with the contact part 210. The number of pins 511 included in the terminal part 510 is not limited to that illustrated in the figure (e.g., three), and the terminal part 510 may include fewer pins 511 or more pins 511. For example, the terminal part 510 may include pogo pins, and in this case, the terminal part 510 may be referred to as a pogo terminal. However, the terminal part 510 is not limited to the pogo terminal, and may include various types of terminals having a compressible contact structure.

According to an embodiment, the compressible contact structure may mean a structure in which the terminal part 510 of the cover device 300 and the contact part 210 of the electronic device 200 come into contact with each other while the terminal part 510 is compressed in the process in which the terminal part 510 and the contact part 210 come into electrical contact with each other. According to an embodiment, the terminal part 510 may include at least one pin 511 (e.g., a pogo pin), and an elastic member may be disposed inside or at the lower end of the pin 511. For example, when the electronic device 200 and the cover device 300 are electrically coupled to each other, the pin 511 of the terminal part 510 may be compressed due to a spring disposed inside or at the lower end of the pin 511, and in the state in which the pin 511 is compressed, the terminal part 510 and the contact part 210 may face each other.

According to an embodiment, in the process in which the electronic device 200 and the cover device 300 are electrically coupled to each other according to the counterclockwise rotation of the first area 311, the coupling direction (or compression direction) of the compressible contact structure and the coupling direction in which the electronic device 200 and the cover device 300 are assembled may be perpendicular to each other. In addition, in the process in which the electronic device 200 and the cover device 300 are electrically separated from each other according to the clockwise rotation of the first area 311, the separation direction (or tensile direction) of the compressive contact structure and the direction in which the electronic device 200 and the cover device 300 are separated from each other may be perpendicular to each other.

In this case, in the process in which the electronic device 200 and the cover device 300 are electrically coupled to each other (or electrically separated from each other), the pin 511 of the terminal part 510 may receive an impact from the electronic device 200 to be worn. For example, when the electronic device 200 and the cover device 300 are coupled to each other, the pin 511 of the terminal part 510 may receive an impact from the electronic device 200 due to interference between the electronic device 200 and the terminal part 510 disposed in the coupling direction. Hereinafter, a cover device 300 having a structure in which the height at which the terminal part 510 is located is adjustable by moving the terminal part 510 depending on the coupling state between the electronic device 200 and the cover device 300 will be described.

FIG. 5A illustrates a state in which the electronic device 200 and the cover device 300 are electrically coupled to each other, and FIG. 5B illustrates a state in which the electronic device 200 and the cover device 300 are electrically separated from each other. In various embodiments of the disclosure, the state in which the electronic device 200 and the cover device 300 are electrically coupled to each other as in FIG. 5A will be referred to as a "first state", and the state in which the electronic device 200 and the cover device 300 are electrically separated from each as in FIG. 5B will be referred to as a "second state". The second state may further include a state in which the electronic device 200 and the cover device 300 are completely separated from each other (e.g., the state of FIG. 3A).

Figure 6:
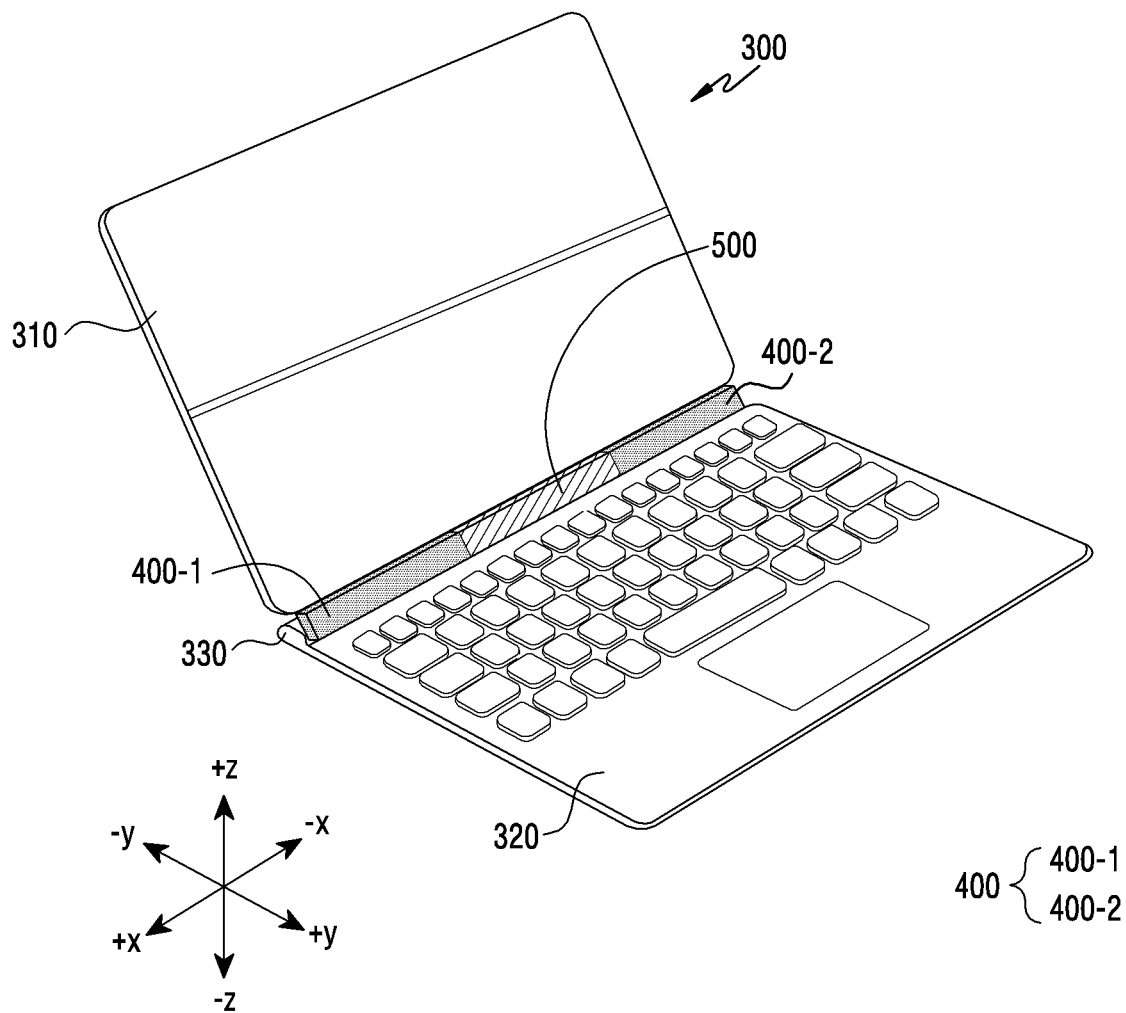
FIG. 6 is a perspective view illustrating a cover device that is couplable to the electronic device according to an embodiment of the disclosure.

FIG. 6 is a perspective view illustrating a cover device 300 that is couplable to the electronic device 200 according to an embodiment of the disclosure.

Referring to FIG. 6, the cover device 300 may include a structure for coupling with the electronic device 200. For example, a structure for coupling with the electronic device 200 may be included in the cover device 300 in a manner being attached to or coupled to a portion of the hinge housing 330. According to an embodiment, the structure for coupling with the electronic device 200 may include a bracket 500 and a support member 400 including a first support member 400-1 and a second support member 400-2. According to an embodiment, the bracket 500 may be a member including the terminal part 510 to be electrically connected to the contact part 210 of the electronic device 200, and the first support member 400-1 and the second support member 400-2 may be members for guiding the movement of the bracket 500 while fixing the bracket 500. The bracket 500, the first support member 400-1, and the second support member 400-2 may have a bar shape (or a rectangular parallelepiped shape) or a shape in which at least a portion of a bar is deformed. However, the shapes of the bracket 500, the first support member 400-1, and the second support member 400-2 are not limited to the above description, and may have various other shapes.

According to an embodiment, the bracket 500, the first support member 400-1, and the second support member 400-2 may be arranged along an edge of the first housing 310 adjacent to a hinge housing 330 (or a second housing 320). According to an embodiment, the bracket 500, the first support member 400-1, and the second support member 400-2 may be disposed adjacent to an area in which the first housing 310 is coupled to the hinge housing 330 to rotate. For example, the bracket 500, the first support member 400-1, and the second support member 400-2 may be arranged side by side, and the first support member 400-1 and the second support member 400-2 may be disposed on opposite sides of the bracket 500, respectively. However, the number of support members 400 is not limited to that illustrated in FIG. 6. In some cases, the cover device 300 may include one support member 400 or may include three or more support members 400.

Figure 7:
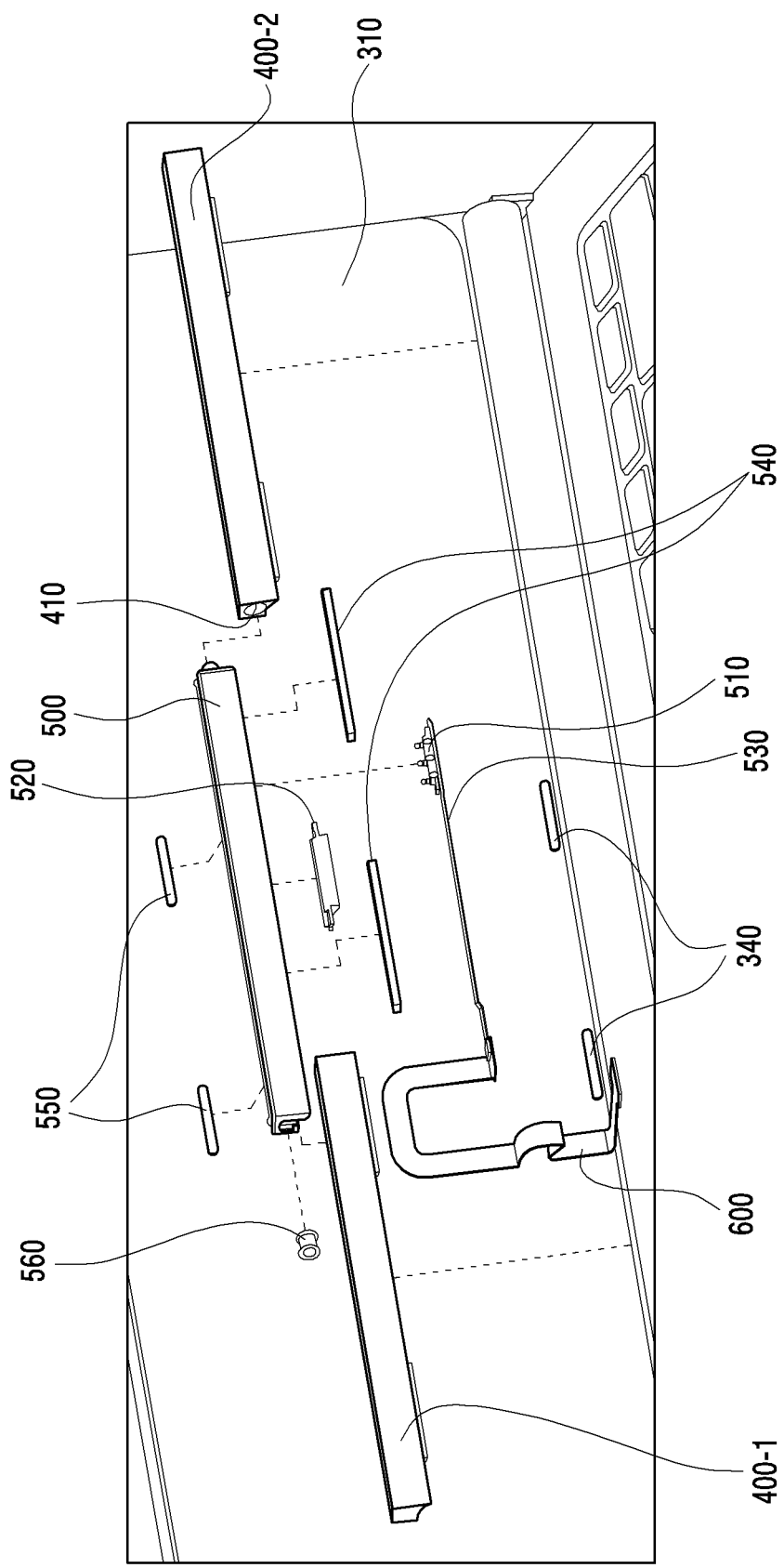
FIG. 7 is an exploded perspective view illustrating components included in the cover device according to an embodiment of the disclosure.

FIG. 7 is an exploded perspective view illustrating components included in the cover device 300 according to an embodiment of the disclosure.

According to an embodiment, the cover device 300 may include a first housing 310, a second housing 320, and a hinge housing 330, and may further include a contact structure disposed adjacent to the first housing 310 and/or the hinge housing 330. Hereinafter, an embodiment of the contact structure will be described in detail with reference to FIG. 7.

Referring to FIG. 7, the contact structure of the cover device 300 may include a bracket 500, a first support member 400-1, a second support member 400-2, a terminal part 510, a terminal bracket 520, a terminal FPCB 530, at least one first magnet 540, at least one second magnet 550, at least one third magnet 340, a connecting member 560, and/or a main FPCB 600. According to an embodiment, on the bracket 500, the terminal part 510, the terminal bracket 520, and at least a portion of the terminal FPCB 530, at least one first magnet 540, and/or at least one second magnet 550 may be disposed, and on the first support member 400-1, at least a portion of the terminal FPCB 530 and at least a portion of the main FPCB 600 may be disposed, and on the first housing 310, at least a portion of the main FPCB 600 and at least one third magnet 340 may be disposed.

According to an embodiment, the at least one first magnet 540 may be magnetically coupled to the electronic device 200 in the first state, and the at least one second magnet 550 may be magnetically coupled to the at least one third magnet 340 in the second state.

According to an embodiment, the terminal part 510 may be disposed on the terminal FPCB 530, and the terminal FPCB 530 may be electrically connected to the main FPCB 600. The terminal part 510 may transmit data (or signals) received from the electronic device 200 to the main FPCB 600 via the terminal FPCB 530, and may receive data (or signals) transmitted from the main FPCB 600 and transmit the data (or signals) to the electronic device 200 via the terminal FPCB 530. Through the above-described process, the electronic device 200 electrically connected to the cover device 300 may receive an input (e.g., a keyboard input) from the cover device 300.

According to an embodiment, the terminal bracket 520 may fix the terminal part 510, and one or more pins 511 included in the terminal part 510 may be exposed to the outside through one or more holes provided in the top surface of the bracket 500. For example, the holes may have a size that allows at least a portion of the pins 511 of the terminal part 510 to be exposed while preventing the remaining portion of the terminal part 510 from being exposed. The number of holes may correspond to the number of pins 511.

According to an embodiment, the connecting member 560 may connect the bracket 500 and the first support member 400-1 to each other, and the connecting member 560 may be engaged with a rail (not illustrated) of the first support member 400-1 to guide the movement of the bracket 500. According to an embodiment, a protrusion (e.g., the second protrusion 506 in FIG. 9) may be provided on the surface of the bracket 500 facing the second support member 400-2, and the protrusion may be engaged with a rail 410 of the second support member 400-2 to guide the movement of the bracket 500.

Figure 8:
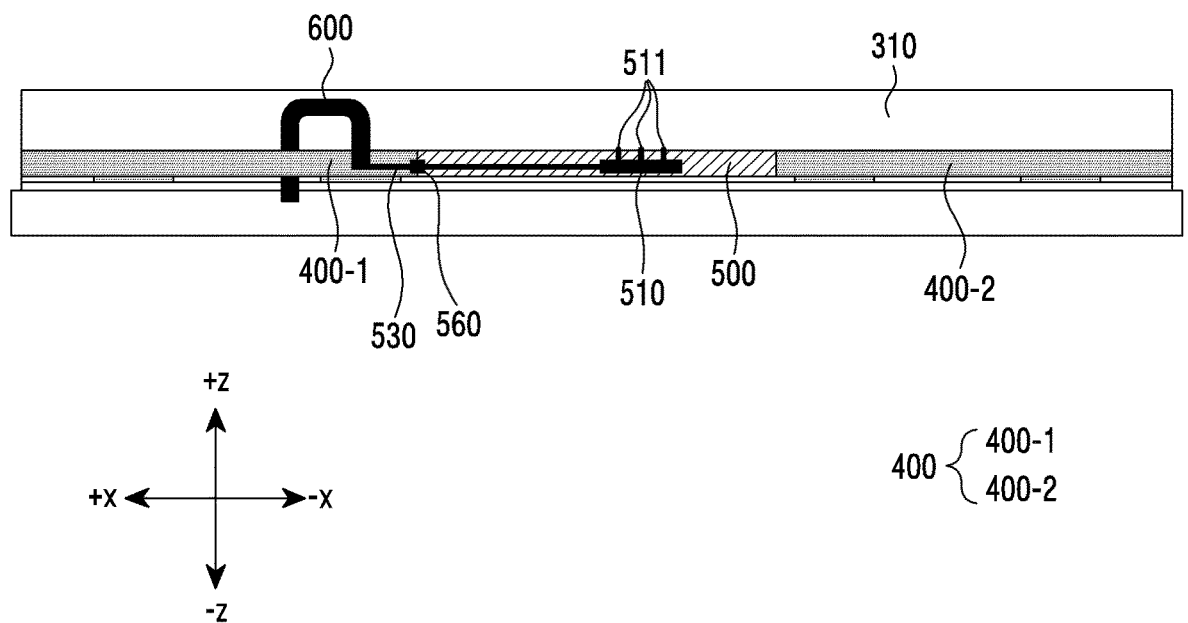
FIG. 8 is a view illustrating a bracket and a support member of the cover device according to an embodiment of the disclosure.

FIG. 8 is a view illustrating the bracket 500 and the support member 400 of the cover device 300 according to an embodiment of the disclosure.

Referring to FIG. 8, the bracket 500 may be fixed by the support member 400 (the first support member 400-1 and the second support member 400-2), and the support member 400 may be fixed to the first housing 310. According to another embodiment, the support member 400 may be configured in an integral structure with the first housing 310. According to another embodiment, the support member 400 may be fixed to or configured as an integral structure with the second housing 320 and/or the hinge housing 330. According to an embodiment, one side of the bracket 500 may be assembled with the first support member 400-1 via a separate connecting member 560, and the other side may be assembled to the second support member 400-2 via a protrusion formed thereon. According to an embodiment, one side of the bracket 500 may have an open structure through which the terminal FPCB 530 is capable of passing, and the other side may have a closed structure provided with a protrusion.

Figure 9:
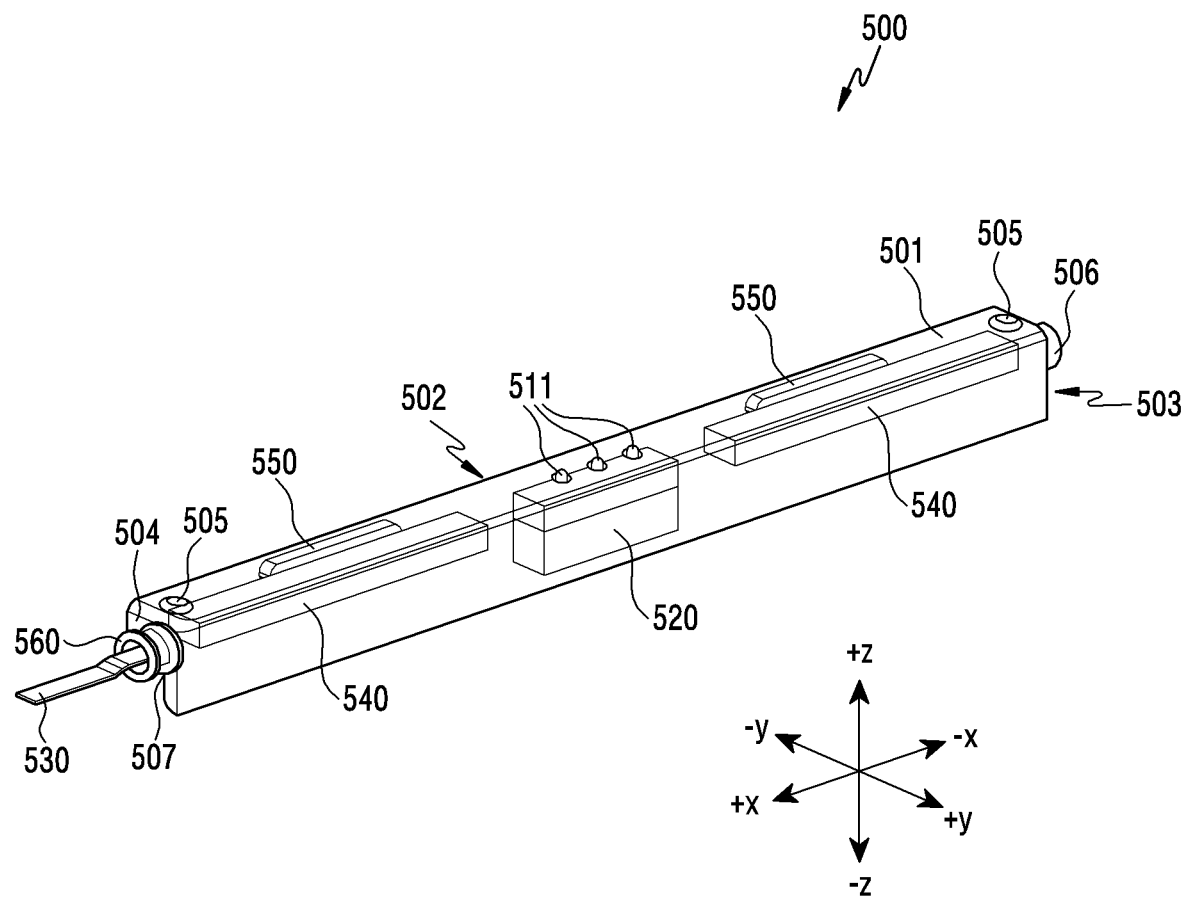
FIG. 9 is a view illustrating components included in the bracket of the cover device according to an embodiment of the disclosure.

FIG. 9 is a view illustrating components included in the bracket 500 of the cover device 300 according to an embodiment of the disclosure.

Referring to FIG. 9, the bracket 500 according to an embodiment may include a first surface 501 on which the terminal part 510 is disposed, a second surface 502 which faces the cover housing, a third surface 503 which faces the second support member 400-2, and a fourth surface 504 which faces the first support member 400-1.

Referring to FIG. 9, for example, in the bracket 500, the first surface 501 is a surface oriented in the +z-axis direction, the second surface 502 is a surface oriented in the −y-axis direction, the third surface 503 is a surface oriented in the −x-axis direction, and the fourth surface 504 may be a surface oriented in the +x-axis direction.

According to an embodiment, the terminal part 510 may be disposed in the center of the first surface 501 adjacent to the first surface 501 of the bracket 500, and the one or more pins included in the terminal part 510 may be exposed to the outside through the holes in the first surface 501. The terminal part 510 may be configured integrally with the terminal FPCB 530, and positions of the terminal part 510 and the terminal FPCB 530 may be fixed by the terminal bracket 520. According to an embodiment, at least one first protrusion 505 may be provided on the first surface 501 of the bracket 500. For example, two first protrusions 505 may be provided on the first surface 501 at one side adjacent to the third surface 503 and at the other side adjacent to the fourth surface 504, respectively. However, the number of first protrusions 505 is not limited thereto. According to an embodiment, the at least one first protrusion 505 may protect the terminal part 510 (or the pins 511 of the terminal part 510) exposed to the outside, and may serve to cause the rotational movement of the bracket 500 in the process of state change between the first state and the second state. In addition, the at least one first protrusion 505 may serve to guide the assembly positions of the electronic device 200 and the cover device 300. A detailed embodiment will be described later with reference to FIGS. 10A and 10B.

According to an embodiment, at least one first magnet 540 may be disposed adjacent to the first surface 501 of the bracket 500. For example, two first magnets 540 may be disposed at opposite sides of the terminal part 510 to be adjacent to the first surface 501. However, the number of first magnets 540 is not limited thereto. The at least one first magnet 540 may apply a magnetic force in the +z-axis direction, and in the first state, and may be magnetically coupled to a magnet included in the electronic device 200 (e.g., the at least one fourth magnet 230 in FIG. 13) or a magnetic member.

According to an embodiment, at least one second magnet 550 may be disposed adjacent to the second surface 502 of the bracket 500. For example, two second magnets 550 may be disposed adjacent to the second surface 502 and arranged side by side. However, the number of second magnets 550 is not limited thereto. The at least one second magnet 550 may apply a magnetic force in the −y-axis direction, and in the second state, may be magnetically coupled to the at least one third magnet 340 disposed in the first housing 310.

According to an embodiment, the magnetic force acting on the at least one first magnet 540 and the magnetic force acting on the at least one second magnet 550 may cross perpendicularly and may cause movement of the bracket 500.

According to an embodiment, a second protrusion 506 may be provided on the third surface 503 of the bracket 500. The second protrusion 506 may have a structure protruding from the third surface 503 in a circular shape. According to an embodiment, the second protrusion 506 may be disposed to be engaged with the rail 410 provided on the second support member 400-2, and the rotational movement of the bracket 500 may be possible due to the circular second protrusion 506.

According to an embodiment, an opening 507 may be provided in the fourth surface 504 of the bracket 500. A connecting member 560 may be assembled to the opening 507 of the fourth surface 504, and the connecting member 560 may be disposed to be engaged with the rail provided on the first support member 400-1. According to an embodiment, the connecting member 560 may have a cylindrical shape, and the rotational movement of the bracket 500 may be possible due to the cylindrical connecting member 560.

Figure 10A:
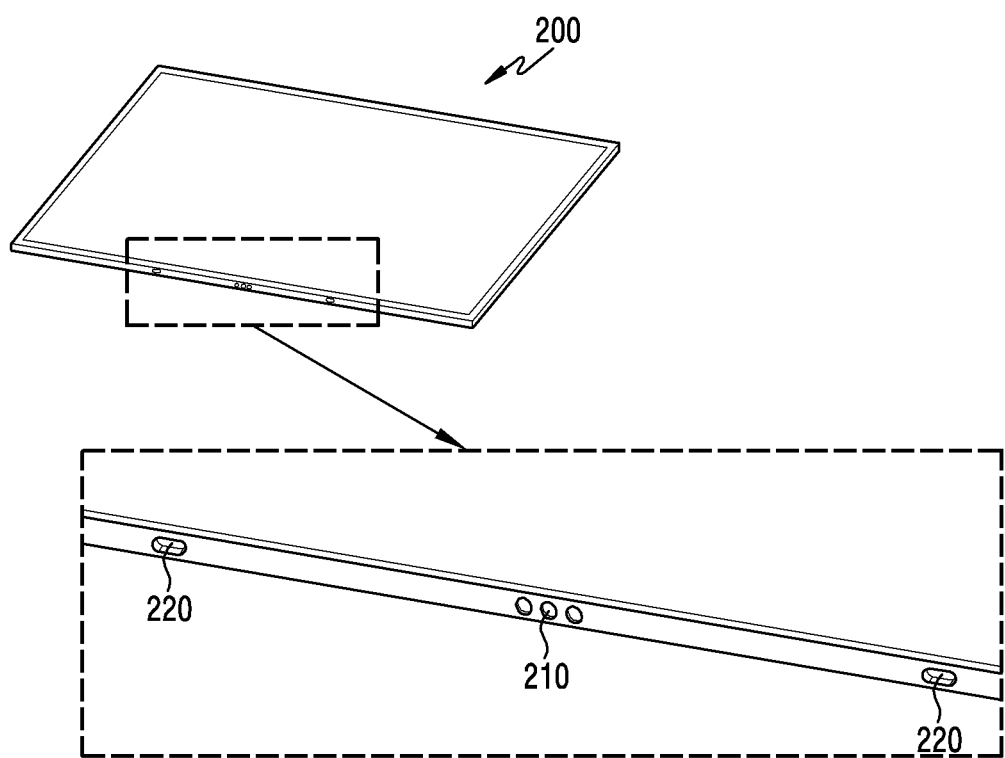
FIG. 10A is a view illustrating an area of the electronic device coupled to the cover device according to an embodiment of the disclosure.

FIG. 10A is a view illustrating an area of the electronic device 200 coupled to the cover device 300 according to an embodiment of the disclosure.

Figure 10B:
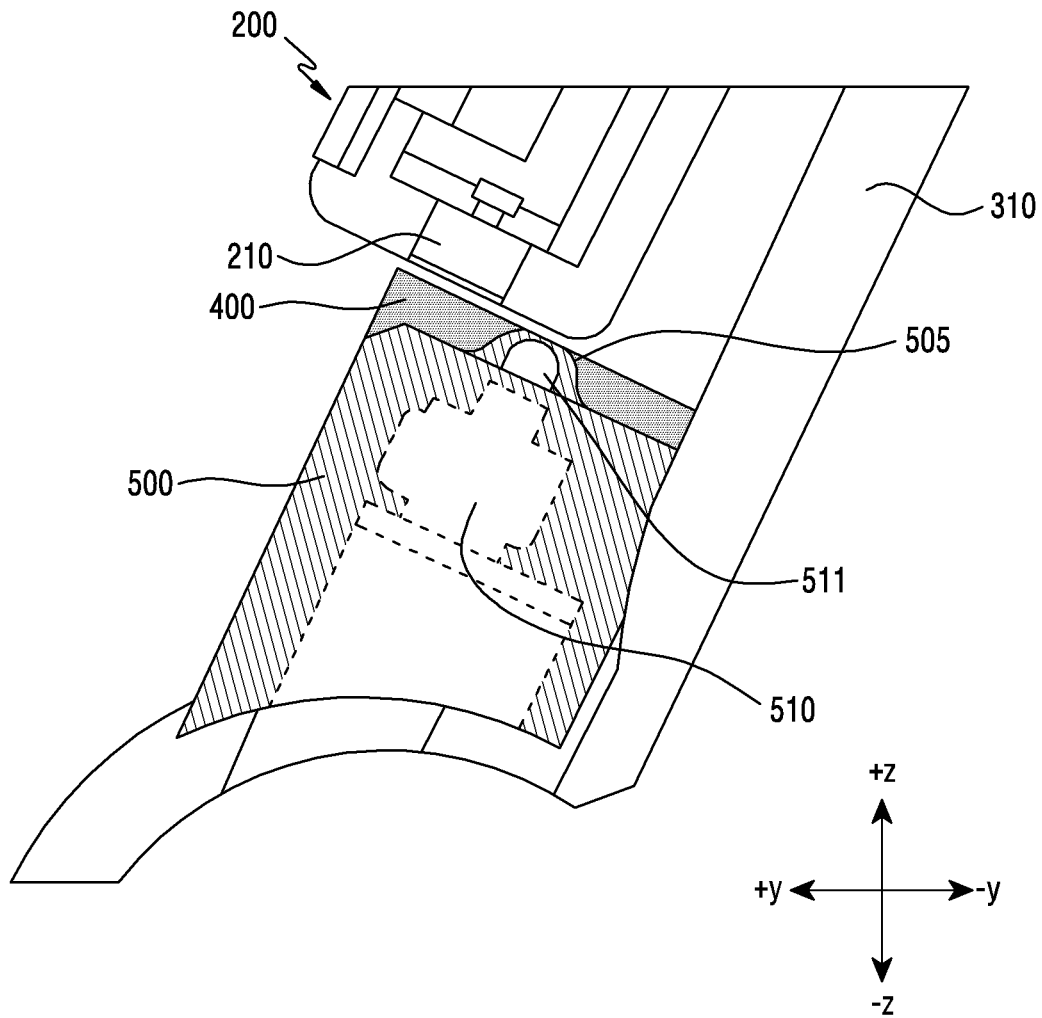
FIG. 10B is a projection view illustrating a coupling structure between the electronic device and the cover device according to an embodiment of the disclosure.

FIG. 10B is a projection view illustrating a coupling structure between the electronic device 200 and the cover device 300 according to an embodiment of the disclosure.

Referring to FIG. 10A, a contact part 210 and at least one groove 220 may be disposed on one side surface of the electronic device 200 (e.g., the surface that comes into contact with the bracket 500 and the support member 400). According to an embodiment, the contact part 210 may be disposed in the center of one side surface of the electronic device 200, and two grooves 220 may be disposed at opposite sides of the contact part 210. However, the number of grooves 220 is not limited thereto, and the number of grooves 220 may be the same as the number of first protrusions 505. The positions at which the contact part 210 and the at least one groove 220 are disposed on the one side surface of the electronic device 200 may correspond, respectively, to the positions at which the terminal part 510 and the at least one first protrusion 505 are disposed on the first surface 501 of the bracket 500.

According to an embodiment, the contact part 210 of the electronic device 200 may be electrically connected to the terminal part 510 of the cover device 300 in the first state, and the at least one groove 220 of the electronic device 200 may be assembled with the at least one first protrusion 505 of the cover device 300 in the first state. According to an embodiment, when the electronic device 200 and the cover device 300 are assembled, the assembly position may be guided by the engagement of the at least one first protrusion 505 and the at least one groove 220. In addition, when the electronic device 200 and the cover device 300 are electrically separated, the at least one first protrusion 505 may be engaged with the at least one groove 220 in the electronic device 200 to impart a rotational force to the bracket 500.

Referring to FIG. 10B, the height of the at least one first protrusion 505 protruding from the first surface 501 may be equal to or greater than the height of the pins 511 of the terminal part 510 protruding from the first surface 501. Accordingly, the at least one first protrusion 505 may protect the terminal part 510 in the process of switching between the first state and the second state. According to an embodiment, in the first state, the terminal part 510 of the cover device 300 may come into contact with the contact part 210 of the electronic device 200, and in the process of coming into contact, the pins 511 of the terminal part 510 may be compressed.

FIG. 11 is a view illustrating a coupling structure between the bracket 500 and the support member 400 of the cover device 300 according to an embodiment of the disclosure.

FIG. 11 may be a view illustrating the bracket 500 when viewed in the +x-axis direction in FIG. 9.

Referring to FIG. 11, the rail 410 disposed on the second support member 400-2 may be assembled to be engaged with the second protrusion 506 of the bracket 500, and the movement of the second protrusion 506 and the bracket 500 may be guided according to the shape of the rail 410. According to an embodiment, the second protrusion 506 may have a protruding circular shape, and the rail 410 may have an oval shape perforated to guide the vertical movement of the bracket 500. Accordingly, in the process of state change between the first state and the second state, the rail 410 of the second support member 400-2 may be engaged with the second protrusion 506 of the bracket 500 to guide the rotation and position shift of the bracket 500. According to an embodiment, the area of the rail 410 may be larger than the area of the second protrusion 506.

Figure 12:
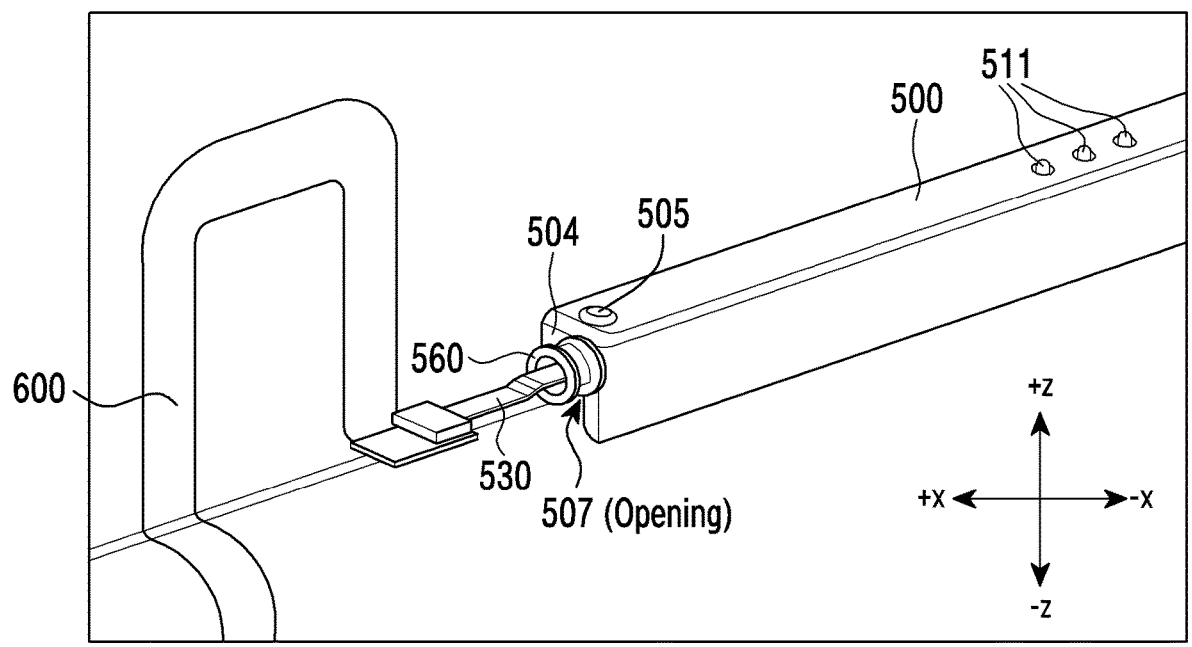
FIG. 12 is a view illustrating a terminal flexible printed circuit board (FPCB) and a main FPCB of the cover device according to an embodiment of the disclosure.

FIG. 12 is a view illustrating the terminal FPCB 530 and the main FPCB 600 of the cover device 300 according to an embodiment of the disclosure.

FIG. 12 may be a view illustrating the bracket 500 in FIG. 9 when viewed in the −x-axis direction.

Referring to FIG. 12, an opening 507 may be provided in the fourth surface 504 of the bracket 500, and the connecting member 560 may be assembled to the opening 507. According to an embodiment, the connecting member 560 may have a hollow cylindrical shape, and the terminal FPCB 530 may pass through the connecting member 560. According to another embodiment, the connecting member 560 may be configured integrally with the bracket 500. One side of the terminal FPCB 530 coming out of the bracket 500 may be electrically connected to the main FPCB 600. This may make it possible to transmit data (and signals) input from the cover device 300, to the electronic device 200.

Although not illustrated, as in FIG. 11, the connecting member 560 may be assembled to be engaged with the rail disposed on the first support member 400-1, and the movement of the connecting member 560 and the bracket 500 may be guided according to the shape of the rail 410. The rail of the first support member 400-1 may also have an oval shape perforated to guide the vertical movement of the bracket 500. Accordingly, in the process of state change between the first state and the second state, the rail of the first support member 400-1 may be engaged with the connecting member 560 to guide the rotation and position shift of the bracket 500.

Figure 13:
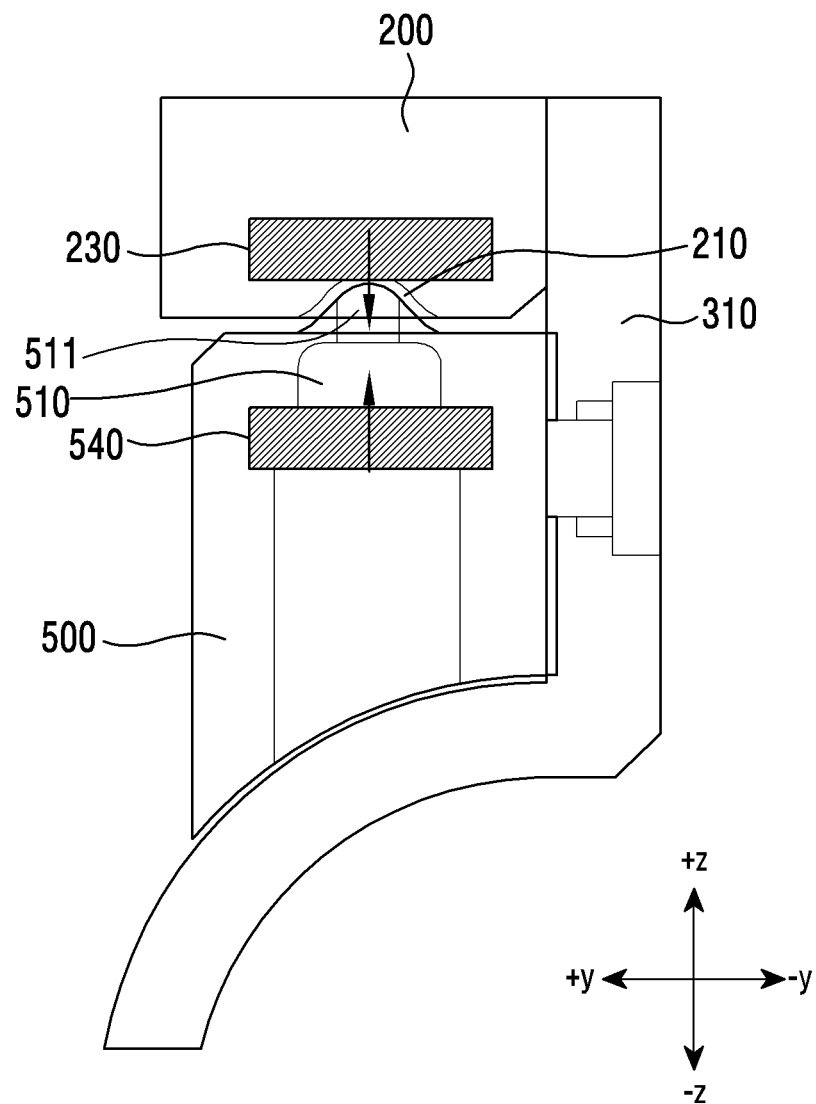
FIG. 13 is a projection view illustrating a state in which the electronic device and the cover device are electrically coupled to each other according to an embodiment of the disclosure.

FIG. 13 is a projection view illustrating a state in which the electronic device 200 and the cover device 300 are electrically coupled to each other (the first state) according to an embodiment of the disclosure.

Referring to FIG. 13, in the state in which a magnetic force between the at least one fourth magnet 230 included in the electronic device 200 and the at least one first magnet 540 included in the bracket 500, for example, an attractive force acts, the electronic device 200 and the cover device 300 may be electrically coupled to each other. According to an embodiment, the at least one first magnet 540 of the bracket 500 may be disposed at a position aligned with the at least one fourth magnet 230 of the electronic device 200 in the first state in which the electronic device 200 is electrically coupled to the cover device 300.

According to an embodiment, due to the magnetic force acting between the at least one first magnet 540 and the at least one fourth magnet 230, the contact part 210 of the electronic device 200 and the compressible terminal part 510 of the cover device 300 may come into contact with each other, and the one or more pins 511 included in the contact part 210 may be compressed with an appropriate force. According to an embodiment, the attractive force acting between the at least one first magnet 540 and the at least one fourth magnet 230 may be greater than the sum of a load applied by the bracket 500 and components included in the bracket 500, a compressive force required in the contact part 210, and a repulsive force caused by the bending of an FPCB (e.g., the terminal FPCB 530 or the main FPCB 600).

FIG. 13 illustrates an embodiment in which the electronic device 200 includes the at least one fourth magnet 230, but the electronic device 200 is not limited thereto and may include a magnetic member (e.g., metal) instead of the fourth magnet 230. In this case, an attractive force may act between the at least one first magnet 540 included in the bracket 500 and the magnetic member included in the electronic device 200.

Figure 14:
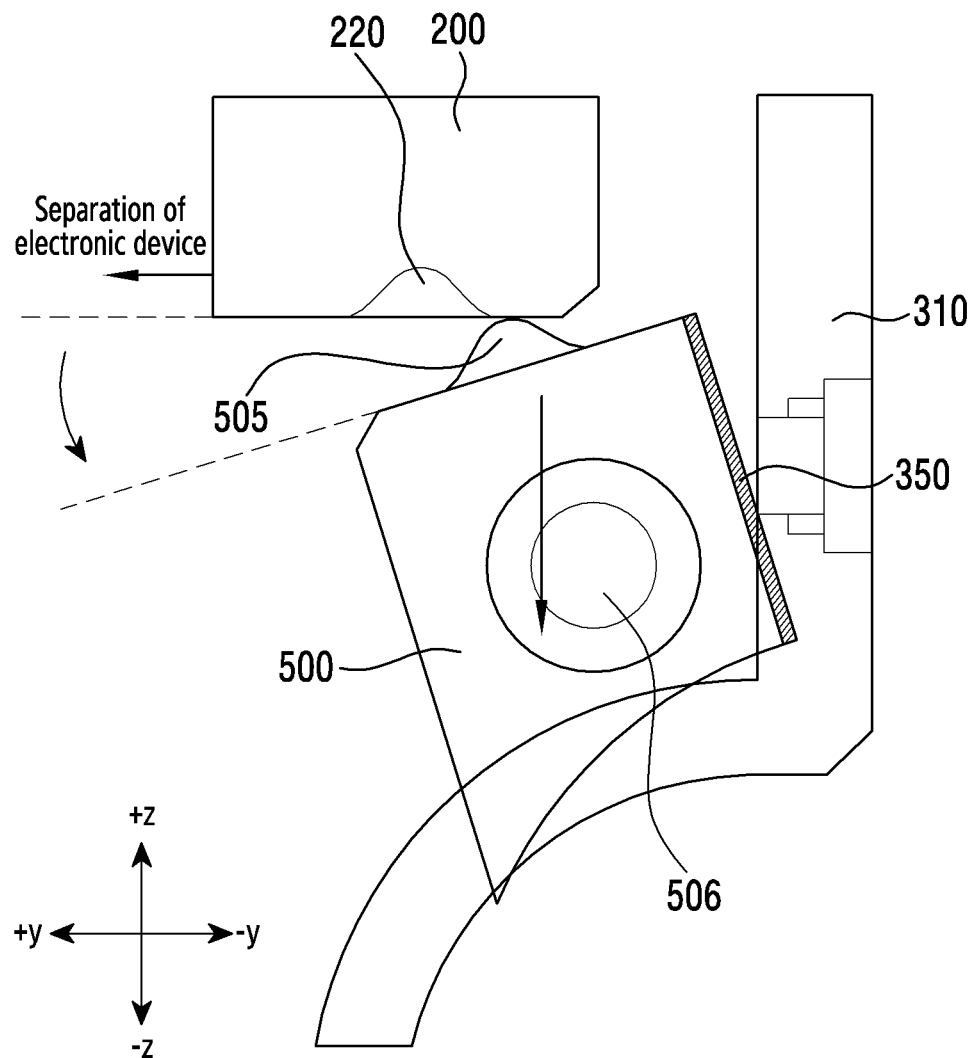
FIG. 14 is a projection view illustrating a process in which the electronic device and the cover device are electrically separated from each other according to an embodiment of the disclosure.

FIG. 14 is a projection view illustrating a process in which the electronic device 200 and the cover device 300 are electrically separated from each other according to an embodiment of the disclosure.

Referring to FIG. 14, in the process in which the electronic device 200 and the cover device 300 are changed from the first state to the second state, the at least one groove 220 of the electronic device 200 may operate together with the at least one first protrusion 505 of bracket 500 to impart a rotational force to the bracket 500. According to an embodiment, due to the circular second protrusion 506 provided on the bracket 500 and the circular (or oval) rail 410 provided on the support member 400, the rotation of the bracket 500 may be possible.

Before rotation, the contact part 210 of the electronic device 200 and the terminal part 510 of the bracket 500 are in contact with each other, and when the electronic device 200 moves in a direction perpendicular to the compression direction of the terminal part 510, the bracket 500 may move downward while rotating in a counterclockwise direction. In this case, the at least one first protrusion 505 may protect the terminal part 510 and may be engaged with the at least one groove 220 to cause the rotational movement of the bracket 500. When the bracket 500 does not rotate, the lifespan of the cover device 300 may be reduced, and the coupling sensation of the cover device 30 may be deteriorated. For example, only the downward movement of the bracket 500 is present without the rotation of the bracket 500, the operating life of the at least one first protrusion 505 and/or the terminal part 510 may be reduced, and since an instantaneous force is concentrated on the at least one first protrusion 505, the quality of experience may be lowered.

According to an embodiment, the first housing 310 may further include a stopper 350. In order to prevent damage to the terminal part 510 due to excessive rotation that may occur when the electronic device 200 is separated, the stopper 350 may limit the rotation angle of the bracket 500 within a predetermined critical angle. For example, the stopper 350 may limit the rotation angle of the bracket 500 within a compression angle (e.g., about 15 degrees) required for safe use of the pins 511 included in the terminal part 510.

Figure 15:
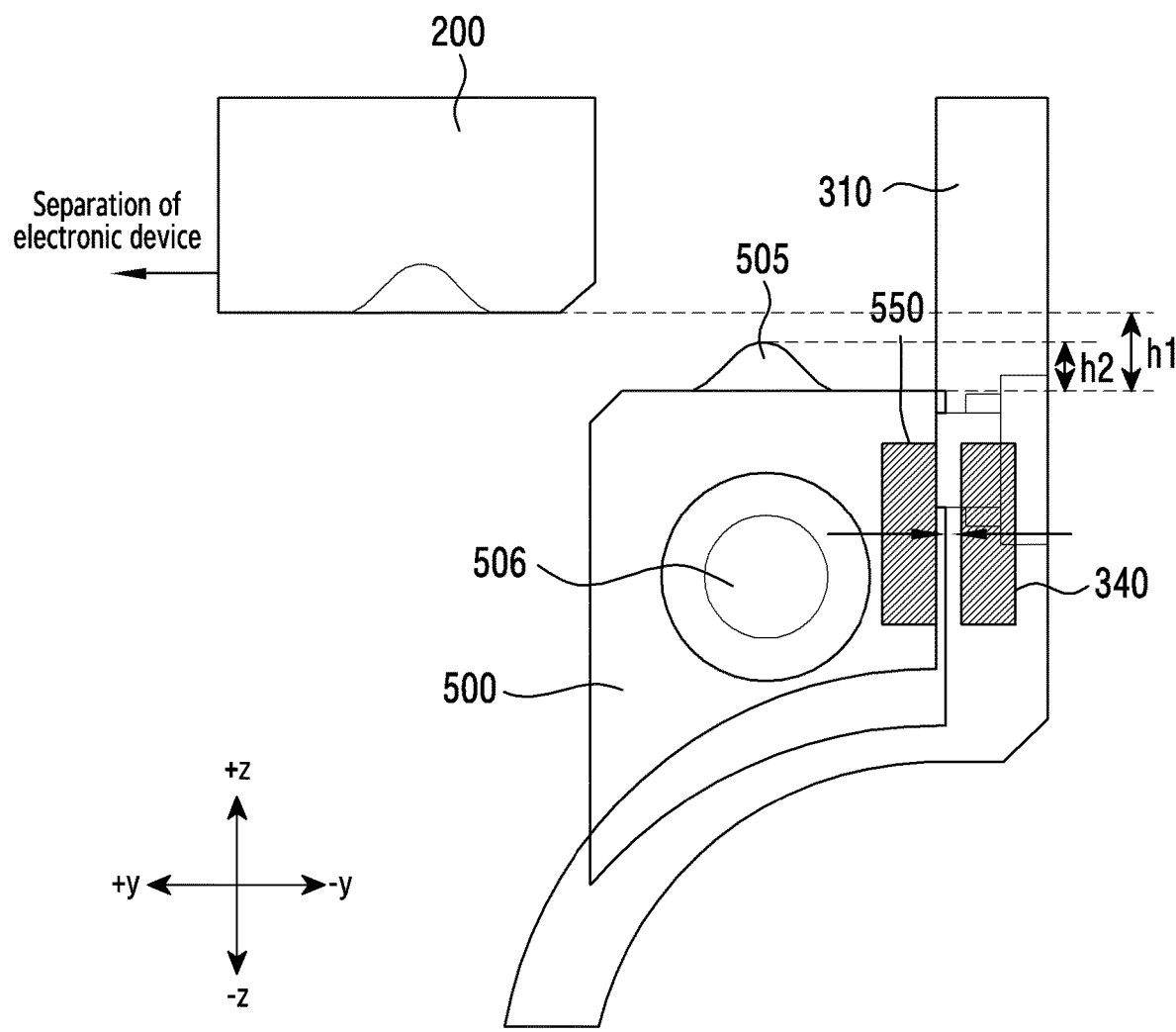
FIG. 15 is a projection view illustrating a state in which the electronic device and the cover device are electrically separated from each other according to an embodiment of the disclosure.

FIG. 15 is a projection view illustrating a state in which the electronic device 200 and the cover device 300 are electrically separated from each other according to an embodiment of the disclosure.

FIG. 15 is a view illustrating a state after the rotation and downward movement of the bracket 500 are terminated according to the separation of the electronic device 200.

Referring to FIG. 15, the at least one third magnet 340 disposed in the first housing 310 may be disposed at a position aligned with the at least one second magnet 550 in the second state in which the electronic device 200 is electrically separated from the cover device 300.

According to an embodiment, the bracket 500 may be rotated by the interaction of the at least one groove 220 and the at least one first protrusion 505 and may shift downward by the attractive force between at least one second magnet 550 of the bracket 500 and the at least one third magnet 340 of the first housing 310. The bracket 500 may shift downward after (or simultaneously with) the rotation and may be fixed in position by a magnetic force acting between the at least one second magnet 550 and the at least one third magnet 340.

According to an embodiment, after the rotation of the bracket 500 by the critical angle (e.g., about 15 degrees), the bracket 500 may shift to a position lower than the initial position (e.g., the position in the first state) by its own weight and the attractive force between at least one second magnet 550 and the at least one third magnet 340. According to an embodiment, at the time of state change between the first state and the second state, the length h1 of downward shift of the bracket 500 may be equal to or greater than the length h2 of the at least one first protrusion 505 protruding from the first surface 501. Accordingly, since the bracket 500 is fixed after shifting down by the length of h1, it is possible to prevent the electronic device 200 and the bracket 500 (or the at least one first protrusion 505) from colliding with each other when the electronic device 200 is electrically coupled again later.

FIGS. 16A, 16B, and 16C are projection views illustrating a series of processes in which the electronic device 200 and the cover device 300 are switched from an electrically coupled state to an electrically separated state according to various embodiments of the disclosure.

FIGS. 16A to 16C illustrate processes of state change of the electronic device 200 and the cover device 300 from the first state to the second state.

FIG. 16A is the first state in which the electronic device 200 and the cover device 300 are electrically coupled to each other. In the first state, an attractive force may act between the at least one fourth magnet 230 of the electronic device 200 and the at least one first magnet 540 of the bracket 500. In the first state, the terminal part 510 of the bracket 500 may be coupled to the contact part 210 of the electronic device 200 and compressed due to the attractive force.

FIG. 16B is an intermediate state when transitioning from the first state to the second state. When the electronic device 200 is electrically separated from the cover device 300, the bracket 500 may shift downward while rotating. In this case, the rail 410 of the support member 400 may be engaged with the second protrusion 506 (or the connecting member 560) of the bracket 500 to guide the rotation and position shift of the bracket 500. The rotational movement of the bracket 500 according to an embodiment may be caused by the engagement of the at least one first protrusion 505 and the at least one groove 220 and the circular second protrusion 506 (or a cylindrical connecting member 560). The downward movement of the bracket 500 according to an embodiment may be caused by the attractive force between the at least one second magnet 550 and the at least one third magnet 340 and the guide of the rail 410.

FIG. 16C is the second state in which the electronic device 200 and the cover device 300 are electrically separated from each other. According to an embodiment, the rotational movement of the bracket 500 in FIG. 16B may be restored again in FIG. 16C. In the second state, an attractive force may act between the at least one second magnet 550 of the bracket 500 and the at least one third magnet 340 of the first housing 310. In the second state, the bracket 500 may be fixed after shifting downward by the length of h1 due to the attractive force.

Figure 17C:
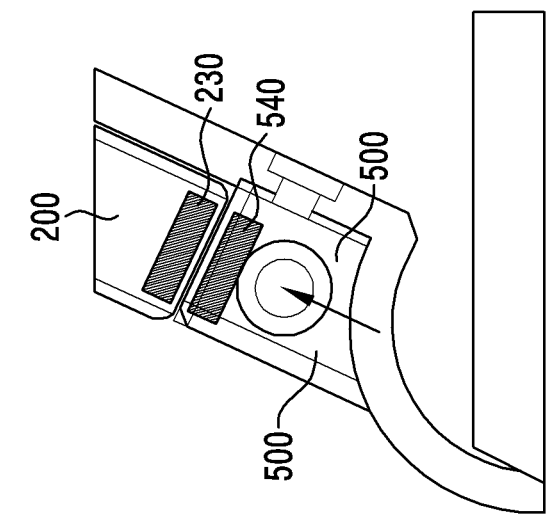
FIGS. 17A, 17B, and 17C are projection views illustrating a series of processes in which the electronic device and the cover device are switched from an electrically separated state to an electrically coupled state according to various embodiments of the disclosure.
Figure 17B:
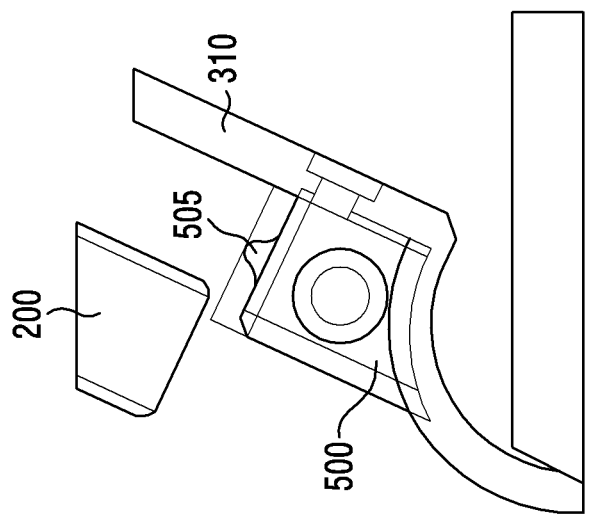
Figure 17A:
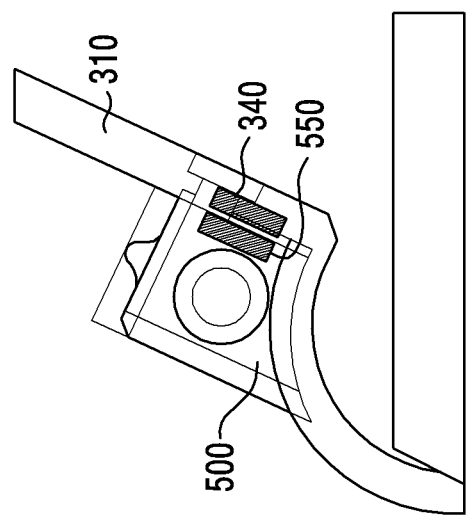

FIGS. 17A, 17B, and 17C are projection views illustrating a series of processes in which the electronic device 200 and the cover device 300 are switched from an electrically separated state to an electrically coupled state according to various embodiments of the disclosure.

FIGS. 17A to 17C illustrate processes of state change of the electronic device 200 and the cover device 300 from the second state to the first state. The series of processes illustrated in FIGS. 17A to 17C may be the reverse of the series of processes illustrated in FIGS. 16A to 16C.

FIG. 17A may be the second state that is the same as that of FIG. 16C. According to an embodiment, in the second state, an attractive force may act between the at least one second magnet 550 of the bracket 500 and the at least one third magnet 340 of the first housing 310. According to an embodiment, in the second state, the bracket 500 may be located lower compared to the first state due to the attractive force.

FIG. 17B is an intermediate state when transitioning from the second state to the first state. The position of the bracket 500 may shift upward while the electronic device 200 approaches for electrical coupling with the cover device 300. In this case, the rail 410 of the support member 400 may be engaged with the second protrusion 506 (or the connecting member 560) of the bracket 500 to guide the position shift of the bracket 500. The upward movement of the bracket 500 according to an embodiment may be caused by the attractive force between the at least one second magnet 550 and the at least one third magnet 340 and the guide of the rail 410.

According to an embodiment, when the electronic device 200 approaches the cover device 300 slowly, the counterclockwise rotation of the bracket 500 may occur due to the attractive force between the at least one second magnet 550 and the at least one third magnet 340 while the bracket 500 is shifting upward. Even when the rotation of the bracket 500 occurs, the stopper 350 may limit the rotation angle of the bracket 500 within a critical angle.

FIG. 17C may be the first state that is the same as that of FIG. 16A. According to an embodiment, in the first state, an attractive force may act between the at least one fourth magnet 230 of the electronic device 200 and the at least one first magnet 540 of the bracket 500. In the first state, the terminal part 510 of the bracket 500 may be coupled to the contact part 210 of the electronic device 200 and compressed due to the attractive force. According to an embodiment, the bracket 500 may be restored to the position of FIG. 17A by shifting upward.

Figures 18A, 18B:
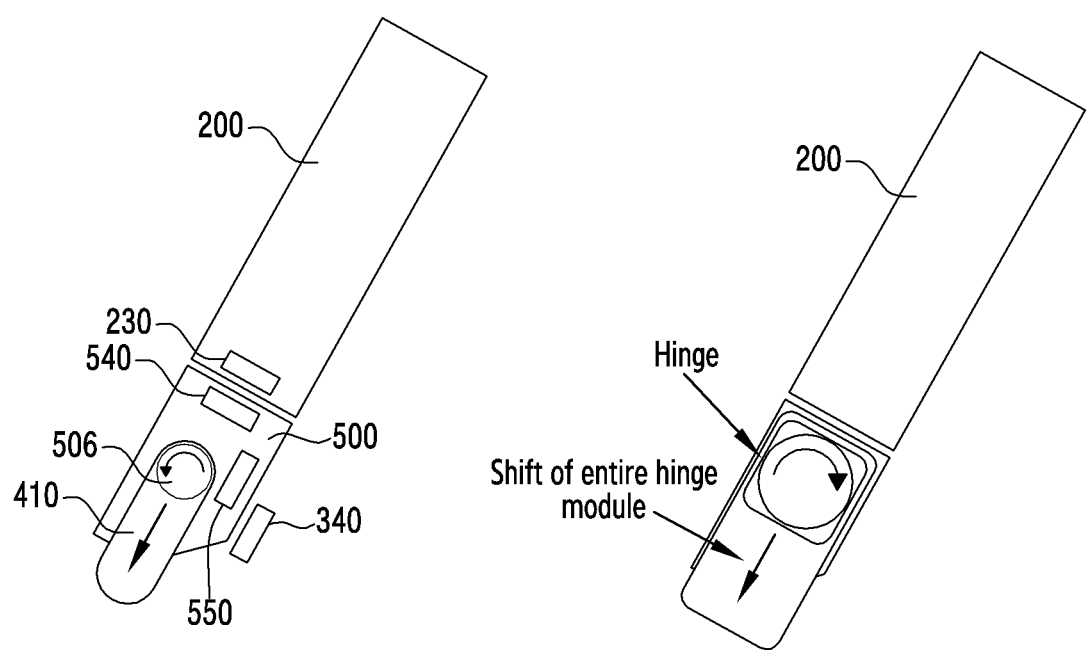
FIGS. 18A and 18B are views illustrating, in comparison, a coupling structure of the cover device that uses a magnetic force and a coupling structure of the cover device that uses a hinge structure according to a comparative embodiment according to various embodiments of the disclosure.

FIGS. 18A and 18B are views illustrating, in comparison, a coupling structure of the cover device 300 that uses a magnetic force and a coupling structure of the cover device 300 that uses a hinge structure according to a comparative embodiment according to various embodiments of the disclosure.

FIG. 18A illustrates a coupling structure of the cover device 300 that uses a magnetic force according to an embodiment of the disclosure, and FIG. 18B is a coupling structure of the cover device 300 that uses a hinge according to a comparative embodiment.

Referring to FIG. 18A, in an embodiment of the disclosure, when the assembly direction between the electronic device 200 and the cover device 300 and the coupling direction (compression direction) of the terminal part 510 are perpendicular to each other, a magnetic force may be used in order to implement the coupling structure between the electronic device 200 and the cover device 300. In the case of the cover device 300 according to an embodiment of the disclosure, it is possible to reduce the volume of the cover device 300 compared with the coupling structure using the hinge structure in FIG. 18B. For example, when the movement of rotation and shift is implemented by using the hinge structure, the hinge housing 330 may be excessively large because a restoration spring is required, and the shift of the hinge housing 330 may be required, so the overall structure may be complicated. Accordingly, the cover device 300 of the disclosure may simplify the overall structure and minimize the arrangement space through the coupling structure that uses a magnetic force.

FIGS. 19A, 19B, 19C, 19D, and 19E are views each illustrating a magnetic force relationship between the electronic device 200 and the cover device 300 according to various embodiments of the disclosure.

Figures 19A, 19B, 19C, 19D, 19E:
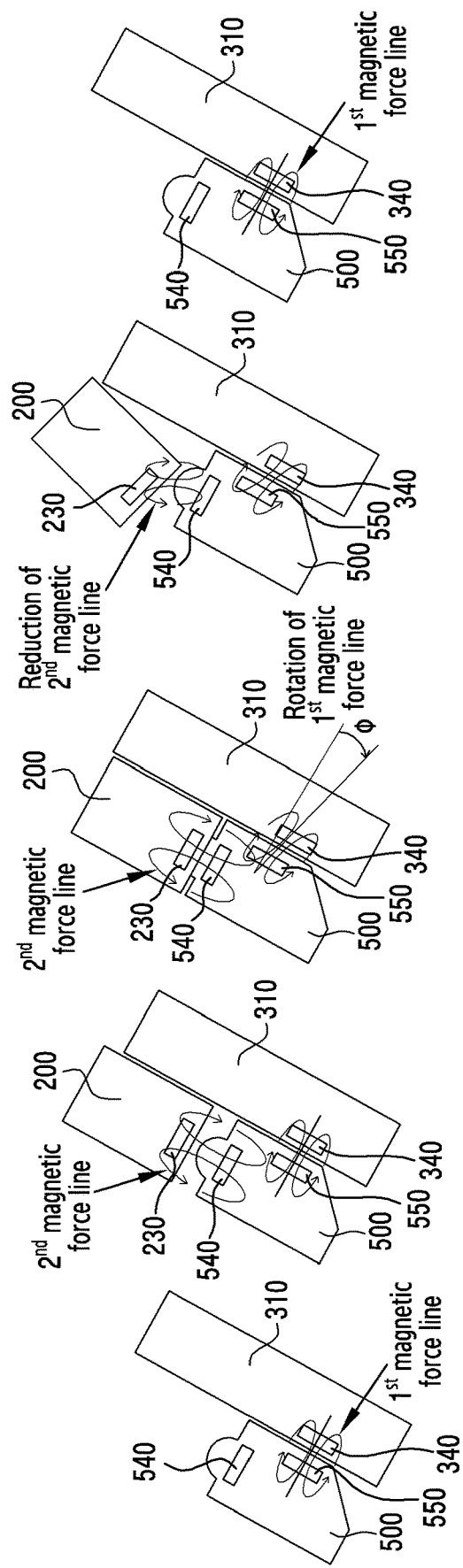
FIGS. 19A, 19B, 19C, 19D, and 19E are views each illustrating a magnetic force relationship between the electronic device and the cover device according to various embodiments of the disclosure.

FIG. 19A is the second state, FIG. 19B is an intermediate state when transitioning from the second state to the first state, FIG. 19C is the first state, FIG. 19D is an intermediate state when transitioning from the first state to the second state, and FIG. 19E is the second state.

Referring to FIGS. 19A to 19E, a magnetic force line acting between the at least one second magnet 550 of the bracket 500 and the at least one third magnet 340 of the first housing 310 will be referred to as a "first magnetic force line", and the magnetic force line acting between the at least one first magnet 540 and the at least one fourth magnet 230 of the electronic device 200 will be referred to as a second magnetic force line. The magnetic force acting by the first magnetic force line and the second magnetic force line may be an attractive force. In various embodiments of the disclosure, between the at least one second magnet 550 and the at least one third magnet 340, only an attractive force may act without the action of a repulsive force, and between the at least one first magnet 540 and the at least one fourth magnet 230 as well, only an attractive force may act without the action of a repulsive force. For example, the first magnet 540, the second magnet 550, the third magnet 340, and the fourth magnet 230 may serve as monopole magnets.

Referring to FIG. 19A, in the second state in which the electronic device 200 and the cover device 300 are electrically separated from each other, only the first magnetic force line may be present. As the electronic device 200 approaches the cover device 300 in FIG. 19B, the second force line may be generated. According to an embodiment, the size of the second magnetic force line may be greater than the size of the first magnetic force line. As the second magnetic force line is generated, the bracket 500 may shift upward toward the electronic device 200 in which the at least one fourth magnet 230 is present by breaking away from the attractive force of the first magnetic force line. Referring to FIG. 19C, the contact part 210 of the electronic device 200 and the terminal part 510 of the cover device 300 may be electrically connected to each other, and the terminal part 510 may be compressed by the second magnetic force line. Referring to FIG. 19C, the first magnetic force line may be rotated by 1, and the effect of the first magnetic force line on the second magnetic force line may correspond to a value reduced to sin Φ. As the electronic device 200 is separated from the cover device 300 in FIG. 19D, the size of the second magnetic force line may decrease. As the size of the second magnetic force line decreases, the bracket 500 may shift downward under the influence of the first magnetic force line. Referring to FIG. 19E, the bracket 500 may shift downward until the at least one second magnet 550 of the bracket 500 and the at least one third magnet 340 of the first housing 310 are aligned with each other, and in the second state, only the first magnetic force line may be present.

In the cover device 300 according to various embodiments of the disclosure, by appropriately designing the first magnetic force line and the second magnetic force line orthogonal to each other, it is possible to assure the correct contact between the terminal part 510 and the contact part 210 and the correct compression (pressing) of the terminal part 510 and prevent the oversize of the cover device 300.

As described above, a cover device of an electronic device according to an embodiment may include: a cover housing configured to cover at least a portion of the electronic device in a first state in which the electronic device is electrically coupled to the cover device; and a bracket including a first surface on which a terminal part is disposed and a second surface which faces the cover housing, wherein the bracket may include at least one first magnet disposed adjacent to the first surface and at least one second magnet disposed adjacent to the second surface, the cover housing may include at least one third magnet, and the at least one third magnet may be disposed to align with the at least one second magnet in a second state in which the electronic device is electrically isolated from the cover device.

According to an embodiment, the at least one first magnet may be magnetically coupled to the electronic device in the first state, and the at least one third magnet may be magnetically coupled to the at least one second magnet in the second state.

According to an embodiment, the position of the bracket may shift downward at a time of state change from the first state to the second state.

According to an embodiment, the cover device may further include a support member including a rail disposed on a side surface adjacent to the bracket, wherein the bracket may include at least one first protrusion disposed on the first surface and a second protrusion disposed on a third surface facing the support member, the at least one first protrusion may be engaged with at least one groove of the electronic device in the first state, and the second protrusion may be engaged with the rail of the support member.

According to an embodiment, at a time of state change from the first state to the second state, the at least one first protrusion may be engaged with the at least one groove to cause rotation of the bracket, and a magnetic force acting between the at least one second magnet and the at least one third magnet may cause downward shift of the position of the bracket.

According to an embodiment, at a time of state change from the first state to the second state, the rail may be engaged with the second protrusion of the bracket to guide rotation and position shift of the bracket.

According to an embodiment, the height of the at least one first protrusion protruding from the first surface may be equal to or greater than the height of the terminal part protruding from the first surface.

According to an embodiment, at a time of stage change from the first state to the second state, the length of downward shift of the bracket may be equal to or greater than the length of the at least one first protrusion protruding from the first surface.

According to an embodiment, the cover housing may further include a stopper, and the stopper may limit the rotation angle of the bracket.

According to an embodiment, a FPCB on which the terminal part is disposed may be disposed inside the bracket, the fourth surface of the bracket may include an opening, and the FPCB may pass through the opening and may be connected to the main FPCB.

According to an embodiment, the cover device may further include a support member including a rail disposed on a side surface adjacent to the bracket, wherein the bracket may further include a connecting member coupled to the opening, and at a time of state change from the first state to the second state, the connecting member may be engaged with the rail to guide rotation and position shift of the bracket.

According to an embodiment, the electronic device may further include at least one fourth magnet disposed to align with the at least one first magnet in the first state, and the magnitude of a magnetic force acting between the at least one first magnet and the at least one fourth magnet may be equal to or greater than the magnitude of a magnetic force acting between the at least one second magnet and the at least one third magnet.

According to an embodiment, a coupling direction between a contact part of the electronic device and the terminal part the bracket may be perpendicular to a coupling direction between the electronic device and the cover device.

According to an embodiment, the terminal part may include a pogo pin configured to transmit/receive data to/from the electronic device in the first state.

As described above, an external input device configured to be electrically coupled to an electronic device according to an embodiment may include: a housing; and a bracket including a terminal part electrically connected to a contact part of the electronic device, wherein the bracket may include at least one first magnet disposed adjacent to a first surface on which the terminal part is disposed, and at least one second magnet disposed perpendicular to the at least one first magnet, the housing may include at least one third magnet, a coupling direction between the contact part of the electronic device and the terminal part of the bracket may be perpendicular to a coupling direction between the electronic device and the external input device, and a circular protrusion disposed on the bracket may guide the rotation and position shift of the bracket depending on a change in coupling state between the electronic device and the external input device.

According to an embodiment, the at least one first magnet may be disposed to align with the at least one fourth magnet of the electronic device in a state in which the electronic device is electrically coupled to the external input device, and the at least one third magnet may be disposed to align with the at least one second magnet in a state in which the electronic device is separated from the external input device.

According to an embodiment, the bracket may further include at least one auxiliary protrusion disposed on the first surface, and the at least one auxiliary protrusion may be disposed to be engaged with at least one groove in the electronic device in a state in which the electronic device is electrically coupled to the external input device.

According to an embodiment, when the electronic device is separated from a state of being electrically coupled to the external input device, the at least one auxiliary protrusion may be engaged with the at least one groove to cause rotation of the bracket, and a magnetic force acting between the at least one second magnet and the at least one third magnet may cause downward shift of the position of the bracket.

According to an embodiment, the height of the at least one auxiliary protrusion protruding from the first surface may be equal to or greater than the height of the terminal part protruding from the first surface, and the length of downward shift of the bracket may be equal to or greater than a length of the at least one auxiliary protrusion protruding from the first surface.

According to an embodiment, the housing may further include a stopper, and the stopper may limit the rotation angle of the bracket.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A cover device of an electronic device, the cover device comprising:
   a cover housing configured to cover at least a portion of the electronic device in a first state in which the electronic device is electrically coupled to the cover device; and
   a bracket including a first surface on which a terminal part is disposed and a second surface which faces the cover housing,
   wherein the bracket includes at least one first magnet disposed adjacent to the first surface and at least one second magnet disposed adjacent to the second surface,
   wherein the cover housing includes at least one third magnet, and
   wherein the at least one third magnet is disposed to align with the at least one second magnet in a second state in which the electronic device is electrically isolated from the cover device.

2. The cover device of claim 1,
   wherein the at least one first magnet is magnetically coupled to the electronic device in the first state, and
   wherein the at least one third magnet is magnetically coupled to the at least one second magnet in the second state.

3. The cover device of claim 1, wherein a position of the bracket shifts downward at a time of state change from the first state to the second state.

4. The cover device of claim 1, further comprising:
   a support member including a rail disposed on a side surface adjacent to the bracket,
   wherein the bracket includes at least one first protrusion disposed on the first surface and a second protrusion disposed on a third surface facing the support member,
   wherein the at least one first protrusion is engaged with at least one groove of the electronic device in the first state, and
   wherein the second protrusion is engaged with the rail of the support member.

5. The cover device of claim 4,
   wherein at a time of state change from the first state to the second state, the at least one first protrusion is engaged with the at least one groove to cause rotation of the bracket, and
   wherein a magnetic force acting between the at least one second magnet and the at least one third magnet causes a position of the bracket to shift downward.

6. The cover device of claim 4, wherein at a time of state change from the first state to the second state, the rail is engaged with the second protrusion of the bracket to guide rotation and position shift of the bracket.

7. The cover device of claim 4, wherein a height of the at least one first protrusion protruding from the first surface is equal to or greater than a height of the terminal part protruding from the first surface.

8. The cover device of claim 4, wherein at a time of stage change from the first state to the second state, a length of downward shift of the bracket is equal to or greater than the length of the at least one first protrusion protruding from the first surface.

9. The cover device of claim 1,
   wherein the cover housing further includes a stopper, and
   wherein the stopper limits a rotation angle of the bracket.

10. The cover device of claim 1,
    wherein a flexible printed circuit board (FPCB) on which the terminal part is disposed is disposed inside the bracket,
    wherein a fourth side of the bracket includes an opening, and
    wherein the FPCB passes through the opening and is connected to the main FPCB.

11. The cover device of claim 10, further comprising:
    a support member including a rail disposed on a side surface adjacent to the bracket,
    wherein the bracket further includes a connecting member coupled to the opening, and
    wherein, at a time of state change from the first state to the second state, the connecting member is engaged with the rail to guide rotation and position shift of the bracket.

12. The cover device of claim 1,
    wherein the electronic device further includes at least one fourth magnet disposed to align with the at least one first magnet in the first state, and
    wherein a magnitude of a magnetic force acting between the at least one first magnet and the at least one fourth magnet is equal to or greater than a magnitude of a magnetic force acting between the at least one second magnet and the at least one third magnet.

13. The cover device of claim 1, wherein a coupling direction between a contact part of the electronic device and the terminal part of the bracket is perpendicular to a coupling direction between the electronic device and the cover device.

14. The cover device of claim 1, wherein the terminal part includes a pogo pin configured to transmit/receive data to/from the electronic device in the first state.

15. An external input device configured to be electrically coupled to an electronic device, the external input device comprising:
    a housing; and
    a bracket including a terminal part electrically connected to a contact part of the electronic device,
    wherein the bracket includes at least one first magnet disposed adjacent to a first surface on which the terminal part is disposed, and at least one second magnet disposed perpendicular to the at least one first magnet, wherein the housing includes at least one third magnet, wherein a coupling direction between the contact part of the electronic device and the terminal part of the bracket is perpendicular to a coupling direction between the electronic device and the external input device, and wherein a circular protrusion disposed on the bracket guides rotation and position shift of the bracket depending on a change in coupling state between the electronic device and the external input device.

16. The external input device of claim 15, wherein the at least one first magnet is disposed to align with at least one fourth magnet of the electronic device in a state in which the electronic device is electrically coupled to the external input device, and wherein the at least one third magnet is disposed to align with the at least one second magnet in a state in which the electronic device is separated from the external input device.

17. The external input device of claim 15, wherein the bracket further includes at least one auxiliary protrusion disposed on the first surface, and wherein the at least one auxiliary protrusion is disposed to be engaged with at least one groove in the electronic device in a state in which the electronic device is electrically coupled to the external input device.

18. The external input device of claim 17, wherein, when the electronic device is separated from a state of being electrically coupled to the external input device, the at least one auxiliary protrusion is engaged with the at least one groove to cause rotation of the bracket, and wherein a magnetic force acting between the at least one second magnet and the at least one third magnet causes downward shift of the position of the bracket.

19. The external input device of claim 18, wherein a height of the at least one auxiliary protrusion protruding from the first surface is equal to or greater than a height of the terminal part protruding from the first surface, and wherein a length of downward movement of the bracket is equal to or greater than a length of the at least one auxiliary protrusion protruding from the first surface.

20. The external input device of claim 15, wherein the housing further includes a stopper, and wherein the stopper limits a rotation angle of the bracket.

21. The external input device of claim 18, wherein the downward shift of the position of the bracket caused by the magnetic force acting between the at least one second magnet and the at least one third magnet causes the bracket to become fixed to the external input device.

22. The external input device of claim 21, wherein, when the bracket is fixed to the external input device, the bracket is unable to rotate relative to the at least one third magnet.

* * * * *